(12) United States Patent
Wheatley

(10) Patent No.: US 7,484,790 B2
(45) Date of Patent: Feb. 3, 2009

(54) COVERING STRUCTURE HAVING AUTOMATIC COUPLING SYSTEM

(76) Inventor: Donald G. Wheatley, 4451 Ford Rd., Ann Arbor, MI (US) 48105

(*) Notice: Subject to any disclaimer, the term of this patent is extended or adjusted under 35 U.S.C. 154(b) by 0 days.

(21) Appl. No.: 11/746,267

(22) Filed: May 9, 2007

(65) Prior Publication Data

US 2007/0205629 A1   Sep. 6, 2007

Related U.S. Application Data

(63) Continuation-in-part of application No. 11/541,902, filed on Oct. 2, 2006, now Pat. No. 7,427,095, which is a continuation-in-part of application No. 11/262,988, filed on Oct. 31, 2005, now Pat. No. 7,204,540, which is a continuation-in-part of application No. 11/227,019, filed on Sep. 15, 2005, now Pat. No. 7,025,403, which is a continuation of application No. 10/826,079, filed on Apr. 16, 2004, now Pat. No. 6,976,724.

(51) Int. Cl.
*B60P 7/02* (2006.01)

(52) U.S. Cl. ............................ 296/100.16; 296/100.18

(58) Field of Classification Search ............ 296/100.16, 296/100.18, 100.15, 100.06, 100.07, 100.09, 296/100.1, 100.02
See application file for complete search history.

(56) References Cited

U.S. PATENT DOCUMENTS

| | | | |
|---|---|---|---|
| 4,279,064 A | * | 7/1981 | Simme .................. 296/100.16 |
| 4,991,640 A | * | 2/1991 | Verkindt et al. ........ 296/100.18 |
| 5,058,652 A | * | 10/1991 | Wheatley et al. ....... 296/100.16 |
| 5,076,338 A | | 12/1991 | Schmeichel et al. |
| 5,174,353 A | * | 12/1992 | Schmeichel et al. ...... 160/368.1 |
| 5,207,262 A | | 5/1993 | Ruchford |
| 5,275,458 A | * | 1/1994 | Barben et al. .......... 296/100.18 |
| 5,460,423 A | * | 10/1995 | Kersting et al. ........ 296/100.18 |
| 5,540,475 A | * | 7/1996 | Kersting et al. ........ 296/100.16 |

(Continued)

OTHER PUBLICATIONS

TruXport TM; Economic Alternative to Snaps, Clips & Zip-Style Strips; No date.

(Continued)

*Primary Examiner*—Kiran B. Patel
(74) *Attorney, Agent, or Firm*—Harness, Dickey & Pierce, P.L.C.

(57) ABSTRACT

A tonneau system for a cargo box of a vehicle having a support frame connectable to the cargo box. A cover spans the support frame and is positionable between a tensioned position and an untensioned position. A pivot block is mounted to the support frame, while the cover is coupled to a front bracket member. The front bracket member carries the cover and pivotally engages the pivot block such that the front bracket member rotates between a raised position and a lowered position. The front bracket member can be automatically locked in the lowered position. The front bracket member can also be unlocked and rotated to a raised position. In the raised position, bracket member may be removed from the support frame and positioned to provide temporary access to the cargo box without unsecuring the remaining portions of the tonneau cover. A bow member couples the cover along a cross vehicle direction. The bow member or other member can operate to tension the cover in the cross vehicle direction.

6 Claims, 28 Drawing Sheets

U.S. PATENT DOCUMENTS

| | | | |
|---|---|---|---|
| 5,758,922 A * | 6/1998 | Wheatley | 296/100.15 |
| 5,984,379 A | 11/1999 | Michel et al. | |
| 6,042,174 A | 3/2000 | Durrani | |
| 6,234,561 B1 * | 5/2001 | Huotari | 296/100.16 |
| 6,257,647 B1 * | 7/2001 | Ninness et al. | 296/100.16 |
| 6,322,129 B2 | 11/2001 | Huotari | |
| 6,439,640 B1 * | 8/2002 | Wheatley | 296/100.18 |
| 6,543,836 B1 * | 4/2003 | Wheatley | 296/100.17 |
| 6,561,561 B2 | 5/2003 | Getzschman et al. | |
| 6,607,234 B1 * | 8/2003 | Schmeichel | 296/100.16 |
| 6,672,644 B2 | 1/2004 | Schmeichel | |
| 6,811,203 B2 | 11/2004 | Wheatley | |
| 6,814,389 B2 * | 11/2004 | Wheatley | 296/100.16 |
| 6,893,073 B2 * | 5/2005 | Wheatley | 296/100.15 |
| 6,976,724 B2 | 12/2005 | Wheatley | |
| 7,025,403 B2 | 4/2006 | Wheatley | |
| 7,104,586 B2 * | 9/2006 | Schmeichel et al. | 296/100.16 |
| 7,204,540 B2 | 4/2007 | Wheatley | |
| 2001/0010430 A1 | 8/2001 | Mentink | |
| 2001/0042987 A1 * | 11/2001 | Getzschman et al. | 296/37.6 |
| 2004/0124658 A1 | 7/2004 | Wheatley | |
| 2004/0212212 A1 | 10/2004 | Spencer et al. | |

OTHER PUBLICATIONS

Lund Genesis; Lund Genesis TM; Lund Genesis TM Rollup Tonneau Bed Cover; Dec. 7, 2005; at http://www.realtruck.com.

TruXedo® Lo Pro; Engineered For a Sleek, Clean Look Lo Profile Soft Roll-Up Tonneau Cover; No date.

Original TruXedo®; Strongest in the Industry All Climate Soft Roll-Up Tonneau Cover; No date.

Agri-Cover, Inc.; Agri-Cover, Inc.; Company Brochure; pp. 1-19; No date.

TonneauMasters; Superior Craftsmanship Quality Engineered Frame-Mounted Tonneau Covers; Sep. 2005.

* cited by examiner

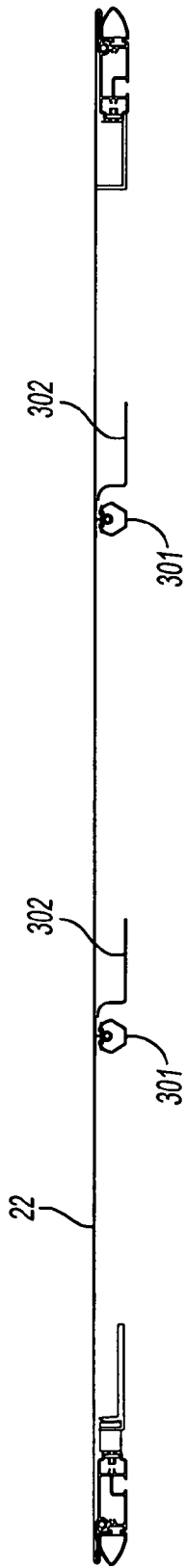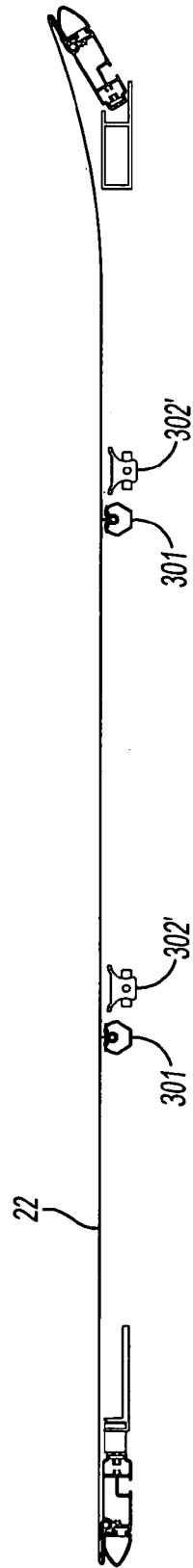

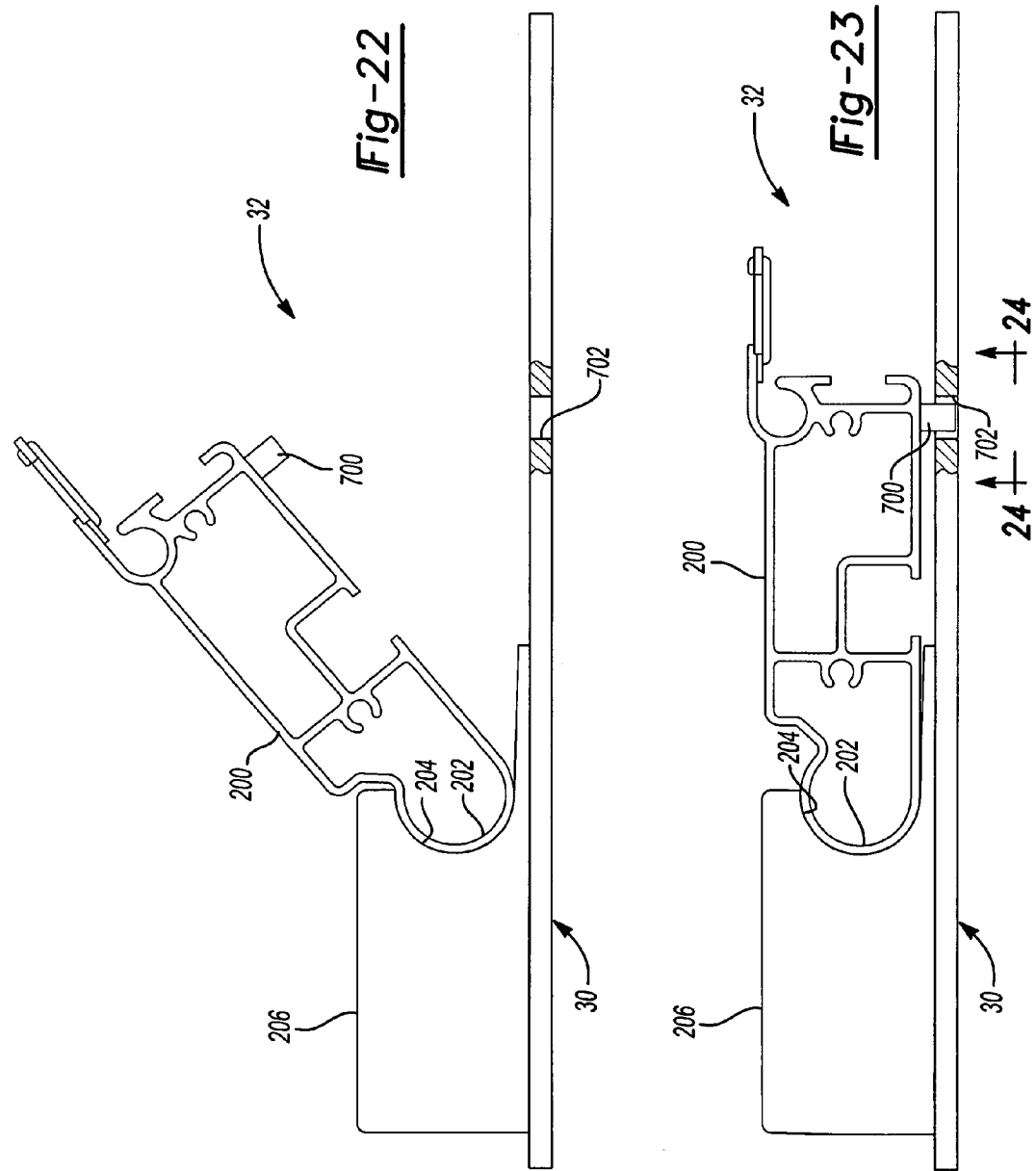

US 7,484,790 B2

COVERING STRUCTURE HAVING AUTOMATIC COUPLING SYSTEM

CROSS-REFERENCE TO RELATED APPLICATIONS

This application is a continuation-in-part of U.S. patent application Ser. No. 11/541,902 filed on Oct. 2, 2006, which is a continuation-in-part of U.S. patent application Ser. No. 11/262,988 filed on Oct. 31, 2005, now U.S. Pat. No. 7,204,540, which is a continuation-in-part of U.S. patent application Ser. No. 11/227,019 filed on Sep. 15, 2005, now U.S. Pat. No. 7,025,403, which is a continuation of U.S. patent application Ser. No. 10/826,079 filed on Apr. 16, 2004, now U.S. Pat. No. 6,976,724. The disclosures of the above applications are incorporated herein by reference.

FIELD OF THE INVENTION

The present invention generally relates to coverings for pickup trucks and, more particularly, relates to a roll up tonneau cover system.

BACKGROUND OF THE INVENTION

Tonneau covers have been used for a number of years to cover the cargo box of pickup trucks against dirt, debris, and other environmental contaminants and to improve the aesthetic quality thereof. Current tonneau covers often employ a VELCRO® hook-and-loop fastening system operably coupled between a soft tarp of the tonneau cover and the sidewalls of the cargo box of the pickup truck. This arrangement permits the tarp to be coupled to the cargo box to conceal the contents thereof or, alternatively, to be rolled up to reveal the contents of the cargo box of the pickup truck. The VELCRO® has disadvantages of wearing over time, pulling, and not allowing the fabric to move freely, which may result in a puckered and wrinkled appearance. Furthermore, VELCRO® tonneau systems, like many others, require a substantial amount of time to remove and properly resecure the tonneau cover in order to gain access to the cargo box of the pickup truck.

A series of bows are typically coupled to the tarp and span the width of the cargo box. These bows serve to support and minimize accumulation of dirt, debris, and other environmental contaminants from collecting on top of the tarp. When the tarp is rolled up, these bows are often enclosed within the tarp bundle.

Typically, these bows are cylindrical in cross-section and the ends thereof rest upon rails fixed to longitudinal sidewalls of the cargo box of the pickup truck. However, often times these bows fail to minimize the lifting action caused by aerodynamic forces during vehicle travel. That is, conventional soft or roll-up type tonneau covers often suffer from flapping at highway speeds, which can lead to premature failure.

Accordingly, there exists a need in the relevant art to provide a tonneau cover system capable of reliably coupling the tonneau cover to the vehicle at various longitudinal locations and overcoming the aerodynamic lifting forces caused during vehicle travel. Additionally, there exists a need in the relevant art to provide a convenient means for gaining temporary access to commonly used portions of the cargo box. Still further, there exists a need in the relevant art to provide a tonneau cover system capable of overcoming the disadvantages of the prior art.

SUMMARY OF THE INVENTION

According to the principles of the present invention, a tonneau system for a cargo box of a vehicle having an advantageous construction is provided. The tonneau cover system includes a support frame connectable to the cargo box. A cover spans the support frame and is positionable between a tensioned position and an untensioned position. Pivot blocks are mounted to the support frame at the front of the cargo box, while the cover is coupled to a corresponding front bracket member. The bracket member carries the cover and pivotally engages the pivot block such that the bracket member rotates between a raised position and a lowered position. The bracket member can be automatically locked in the lowered position by a latch mechanism. A portion of the tonneau cover at the front of the cargo box may be unsecured and positioned to provide temporary access to the cargo box without unsecuring the remaining portions of the tonneau cover. A bow member couples the cover along a cross vehicle direction. The bow member or other member can operate to tension the cover in the cross vehicle direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13 is a cross section view illustrating the tonneau cover system of the present invention in the retained position employing a retaining bracket;

FIG. 14 is a cross section view illustrating the tonneau cover system of the present invention in the released position employing a retaining block member;

FIG. 22 is a side view illustrating a rear bracket member and a pivot block according to another embodiment in an initial position;

FIG. 23 is a side view illustrating the rear bracket member and the pivot block in a down and locked position;

DETAILED DESCRIPTION OF THE PREFERRED EMBODIMENTS

The following description of the preferred embodiments is merely exemplary in nature and is in no way intended to limit the invention, its application, or uses.

Figure 1:
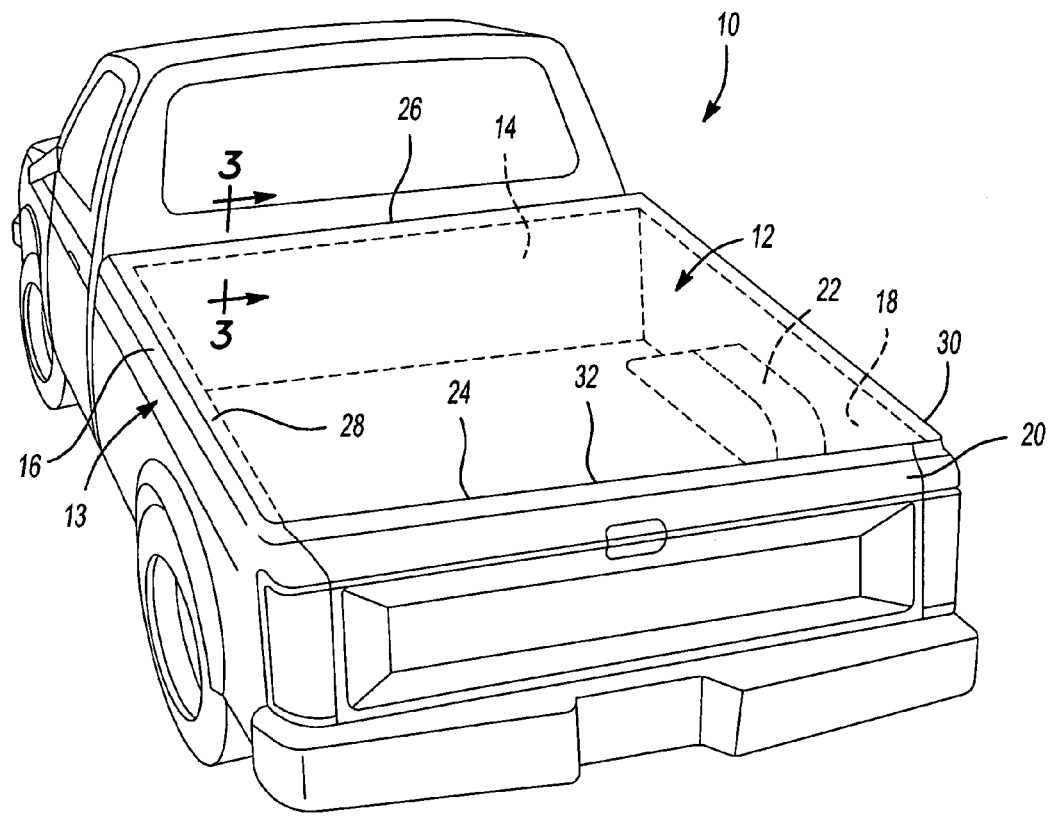
FIG. 1 is a perspective view illustrating a pickup truck having a tonneau cover system according to the principles of the present invention.
Figure 2:
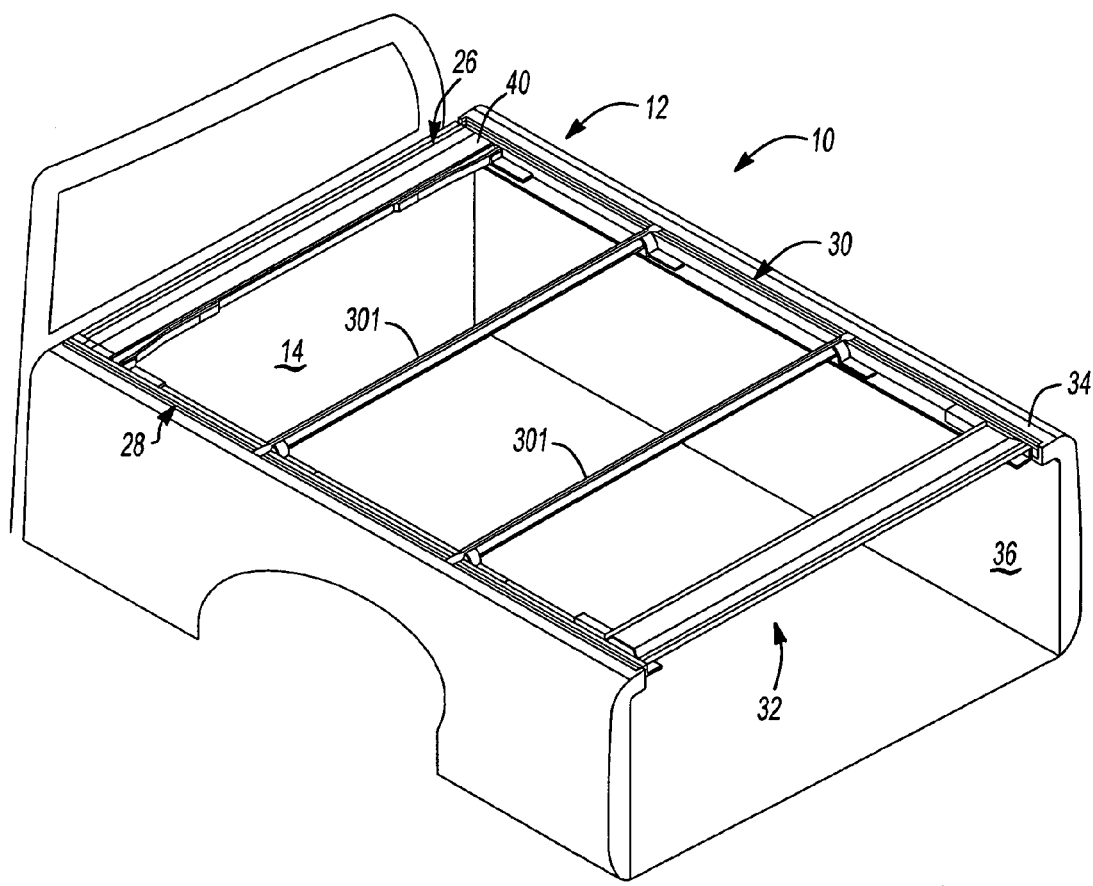
FIG. 2 is a perspective view illustrating the pickup truck having the tonneau cover system according to the principles of the present invention with portions removed for clarity.

With reference to FIGS. 1 and 2, a pickup truck 10 is shown having a roll up tonneau system 12 which is attached to a cargo box 13 according to the present invention. Cargo box 13 has a front wall 14, a left sidewall 16, a right sidewall 18, and a rear wall or tailgate 20. Roll up tonneau system 12 includes a flexible, stretchable fabric cover 22 that is drawn tightly over a substantially rigid rail support system 24 and removably attached to rail support system 24. Rail support system 24 is comprised of a number of frame rails that are attached to one another to form a rectangular frame. The frame rails included are a front frame rail or head rail assembly 26, a left side frame rail assembly 28, a right side frame rail assembly 30, and a rear frame rail assembly 32. Rail support system 24 is aligned with and coupled to the top of sidewalls 16 and 18 of cargo box 13 as well as the top of front wall 14 and tailgate 20, according to one of many methods. A clamping system or fastening system may be used to fasten the rail assemblies 26, 28, 30, and 32 to the sidewalls 16 and 18 of pickup truck 10. An example of a clamping system can be found in commonly-assigned U.S. patent application Ser. No. 10/331,711, entitled "Roll Up Tonneau Cover System." The disclosure of this application is incorporated herein by reference. Stretchable fabric cover 22 is support cross-vehicle via a plurality of cross bows 301, which each selectively engage corresponding retaining members coupled to left side frame rail assembly 28 and right side frame rail assembly 30, which will be discussed in detail below.

It should be understood that right sidewall 18 and left sidewall 16 of pickup truck 10 and the corresponding right side frame rail assembly 30 and left side frame rail assembly 28 are identical in construction, yet arranged in mirrored symmetry. Accordingly, in the interest of brevity, only one side will be discussed in detail below unless noted otherwise.

Still referring to FIGS. 1 and 2, right side frame rail assembly 30 is coupled to right sidewall 18 of cargo box 13 of pickup truck 10. As can be seen, sidewall 18 of cargo box 13 includes a generally horizontal top surface 34 and a downwardly extending inside wall 36. However, it should be appreciated that generally horizontal top surface 34 and downwardly extending inside wall 36 may have any one of a number of configurations, which are dependent upon styling and functionality determined by the vehicle manufacturer. Hence, it should be understood that the particular shape of these surfaces/walls may vary, along with the specific shape of those corresponding components of frame rail assembly 30.

Figure 3:
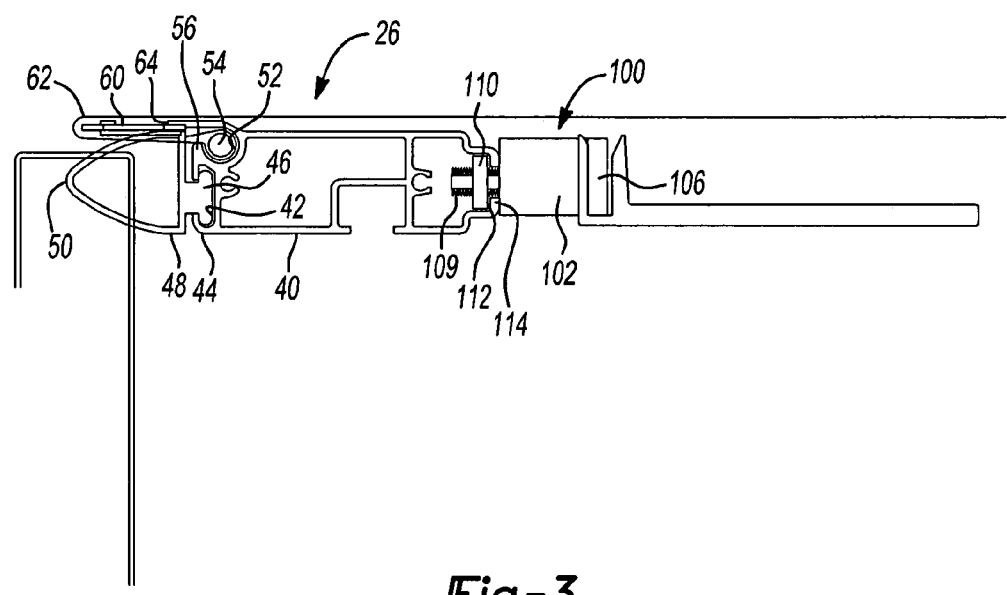
FIG. 3 is a cross sectional view illustrating the head rail assembly taken along line 3-3 of FIG. 1.

Turning now to FIG. 3, head rail assembly 26 will now be described in detail. As can be seen in the figure, head rail assembly 26 generally includes an extruded front bracket member 40. Extruded front bracket member 40 is preferably made of a light-weight, corrosion resistant material, such as aluminum. Extruded front bracket member 40 includes a gasket channel 42 extending longitudinally along a forward portion 44 of extruded front bracket member 40. Gasket channel 42 is sized to receive a corresponding channel feature 46 of a flexible gasket member 48 such that flexible gasket member 48 is coupled with and supported by extruded front bracket member 40. Gasket member 48 is positionable such that it engages and forms a fluid seal between a nose portion 50 of gasket member 48 and front wall 14 of pickup truck 10. In this regard, water and other environmental contaminants are prevented from entering cargo box 13 of pickup truck 10. During assembly, channel feature 46 of flexible gasket member 48 is slid into gasket channel 42.

Extruded front bracket member 40 further includes cover retaining slot 52 extending longitudinally along forward portion 44 of extruded front bracket member 40. Cover retaining slot 52 is sized to receive a corresponding rod member 54. Preferably, rod member 54 is received within a channel 56 sewn or otherwise formed in stretchable fabric cover 22. In this regard, stretchable fabric cover 22 is reliably retained in connection with extruded front bracket member 40. During assembly, rod member 54 is first slid into channel 56 of stretchable fabric cover 22 and the two are slid into cover retaining slot 52.

Still referring to FIG. 3, extruded front bracket member 40 further includes a tip support 60 extending along forward portion 44. Tip support 60 is adapted to be received between a fold-back portion 62 of stretchable fabric cover 22 and provides support to stretchable fabric cover 22. Tip support 60 permits stretchable fabric cover 22 to extend forward from extruded front bracket member 40 to bridge a gap between extruded front bracket member 40 and front wall 14 and to further conceal gasket member 48. Tip support 60 may be received within a support channel 64 formed in extruded front bracket member 40. However, it should also be understood that tip support 60 may be integrally formed with extruded front bracket member 40 or may be part of a separate polymer extrusion to which the stretchable fabric cover 22 is sewn. This extrusion would be slidably engaged with bracket member 40.

Figure 4:
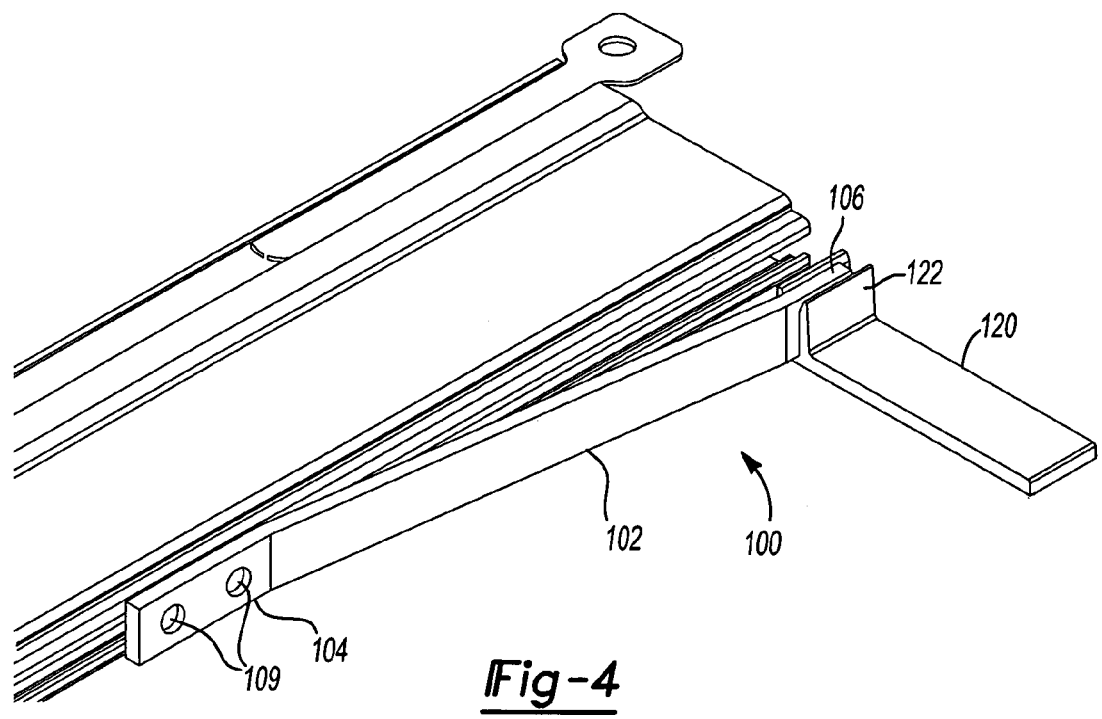
FIG. 4 is an enlarged perspective view illustrating the adjustment beam mechanism.

Referring now to FIGS. 3 and 4, tonneau system 12 further includes an adjustment beam mechanism 100 engagable with extruded front bracket member 40. Adjustment beam mechanism 100 is provided for maintaining a constant tensional force on stretchable fabric cover 22 to a desired tightness. Adjustment beam mechanism 100 includes a cantilever beam member 102 having a first end 104 and a second end 106. First end 104 of cantilever beam member 102 is fixedly mounted to extruded front bracket member 40 via conventional fasteners 109 and a mounting bracket 110. Mounting bracket 110 is slidably engaged in slot 112 of extruded front bracket member 40. Mounting bracket 110 is preferably sized to permit simple positioning of mounting bracket 110 and cantilever beam member 102 relative to extruded front bracket member 40 when the fasteners are loosened. However, on the other hand, mounting bracket 110 should preferably frictionally engage flanges 114 when the fasteners are tightened.

As best seen in FIGS. 2-4, adjustment beam mechanism 100 further includes a finger member 120, which is operably coupled to frame rail assembly 30. Finger member 120 is sized to extend upward from frame assembly 30 in a generally L-shaped configuration. An end 122 of finger member 120 is engagable with second end 106 of cantilever beam member 102. Such engagement of finger member 120 against the biasing force of cantilever beam member 102 cause extruded front bracket member 40 to be urged forward (relative to the vehicle) to draw stretchable fabric cover 22 tightly over rail support system 24.

It should be understood that cantilever beam member 102 may be pre-bent to tailor a desired biasing force. It is generally desired that adjustment beam mechanism 100 is disposed on each side of the vehicle bed to provide equal tensioning thereabout. Specifically, it is desired that adjustment beam mechanism 100 is arranged to provide about 15 to 10 pounds of tensioning force on each side.

Figure 5:
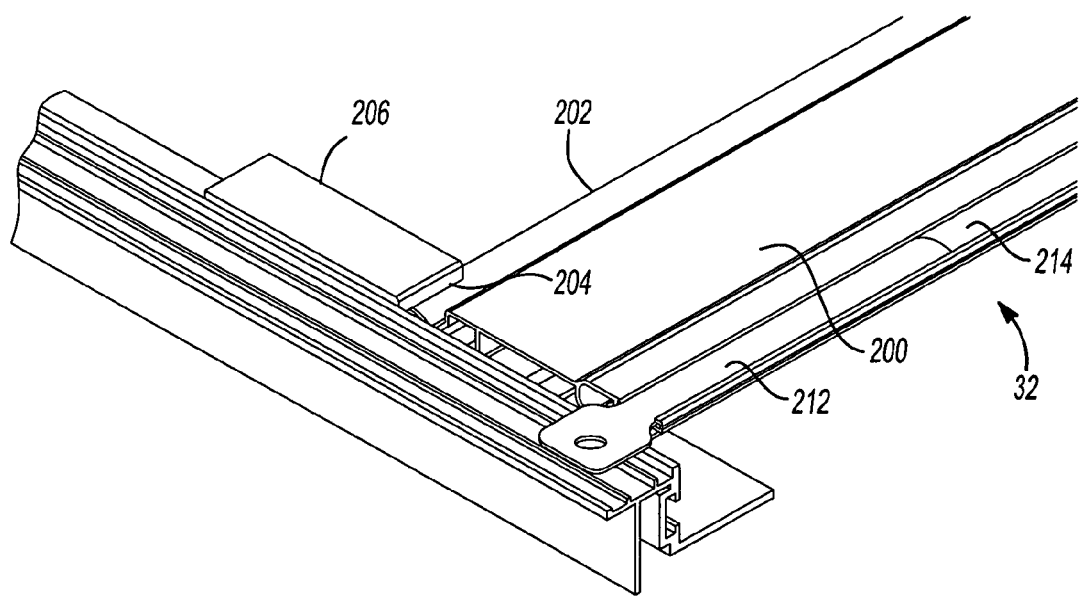
FIG. 5 is an enlarge perspective view illustrating the rear frame rail assembly.

Turning now to FIG. 5, rear frame rail assembly 32 will be described in detail. Rear frame rail assembly 32 generally includes an extruded rear bracket member 200. Rear bracket member 200 is similar in construction to front bracket member 40; however, rear bracket member 200 includes a rounded bull nose portion 202. Rear bracket member 200 further includes a receiving channel 56' for receiving rod member 54 coupled to fabric cover 22 similarly as mentioned above. Rear frame rail assembly 32 still further includes a latching system, such as that described in commonly-assigned U.S. patent application Ser. No. 10/331,711, entitled "Roll Up Tonneau Cover System."

With continued reference to FIG. 5, rounded bull nose portion 202 of rear bracket member 200 is sized to be pivotally received within a concave portion 204 of a corresponding rear pivot block 206. In this regard, rear frame rail assembly 32 may pivot upward about the interface between rounded bull nose portion 202 and concave portion 204 into a raised position (see FIG. 6). In this raised position, the tension in fabric cover 22 is released. However, in a lowered position, the tension is then again exerted upon fabric cover 22 according to the biasing force of adjustment beam mechanism 100. Rear pivot block 206 is fixedly coupled to frame rail assembly 30 via conventional means, such as fasteners. It should be appreciated that as rear bracket member 200 is lowered into a down position, fabric cover 22 is drawn rearward against the biasing force of adjustment beam mechanism 100. During this operation, fabric cover 22 is translated rearward a predetermined distance. This translation distance will be used to affect additional retaining features that will be described in detail below. During an opposing operation, the raising or pivoting of rear bracket member 200 causes the tension in fabric cover 22 to be released, which causes fabric cover 22 to translate forward in response to the biasing forces of adjustment beam mechanism 100.

Still referring to FIG. 5, rear bracket member 200 further includes a strip member 212 extending along rearward portion 210. Strip member 212 is adapted to be sewn into fabric cover 22 and provides support to stretchable fabric cover 22. Strip member 212 may be received within a support channel 214 formed in rear bracket member 200. However, it should also be understood that strip member 212 may be integrally formed with rear bracket member 200.

Figure 24:
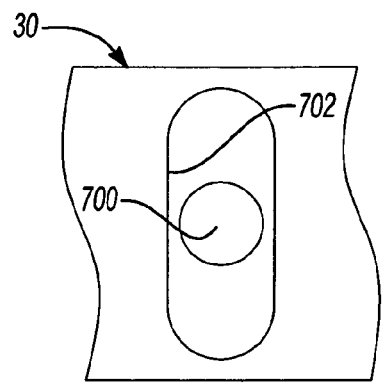
FIG. 24 is a bottom view of a portion of the rear bracket member and side frame assembly in the down and locked position.

With reference to FIGS. 22-24, rear bracket member 200 may optionally include a stop member 700 extending outwardly from a bottom portion thereof. Stop member 700 may be in the form of a pin or post having a generally circular cross section. Furthermore, frame rail assembly 30 may have an elongated slot 702 formed therein which extends lengthwise in the cross vehicle direction. Slot 702 is positioned complementary to stop member 700 and adapted to receive stop member 700 when rear bracket member 200 is lowered to the down position. It should be appreciated that the interconnection of stop member 700 and slot 702 when rear bracket member 200 is lowered to the down position provides a positive and fixed position between rear bracket member 200 and pivot block 206 in a fore-aft direction of pickup truck 10, yet permits lateral movement of rear bracket member 200 relative to pivot block 206 in the cross-vehicle direction along the length of slot 702. This encourages proper alignment of tonneau system 12.

With reference to FIGS. 15-22, an alternative rear frame assembly and latch system 500 will be described in detail. Rear frame rail and latch system 500 generally comprises an extruded rear bracket member 510, a latching assembly 512, and frame rail assembly 30. Rear bracket member 510 is similar in construction to rear bracket member 200 and front bracket member 400 except for the features that will be described herein. Rear bracket member 510 and latching assembly 512 work together to define a system that captures and retains rear bracket member 510 relative to latching assembly 512, yet permits lateral movement of rear bracket member 510 relative to latching assembly 512.

With particular reference to FIGS. 15 and 17-20, rear bracket member 510 is illustrated being made of a light-weight, corrosion resistant material, such as aluminum. Rear bracket member 510 generally comprises a top face 514, a bottom face 516, an interconnecting inclined face 518 disposed between top face 514 and bottom face 516, and a latching face 520. Top face 514 is generally disposed in planar relationship with a top section of latching assembly 512, which will be described herein. Bottom face 516 is disposed parallel to, but spaced offset from, a top portion of tailgate 20. It is anticipated that stretchable fabric cover 22 will extend along top face 514, down inclined face 518, and terminate at an intersection of inclined face 518 and bottom face 516. To this end, a cover retaining slot 522 extends longitudinally along an edge of rear bracket member 510. Cover retaining slot 522 is sized to receive a corresponding rod member 54. Preferably, rod member 54 is received within a channel 56 sewn or otherwise formed in stretchable fabric cover 22. In this regard, stretchable fabric cover 22 is reliably retained in connection with rear bracket member 510. During assembly, rod member 54 is first slid into channel 56 of stretchable fabric cover 22 and the two are slid into cover retaining slot 522.

A seal groove 524 is disposed adjacent cover retaining slot 522 for receiving a seal member 526 therein. Seal member 526 is adapted to sealingly engage and/or contact a top surface of tailgate 20. Seal member 526 may have any cross-sectional shape that is conducive to sealingly engage the top surface of tailgate 20.

A slidenut channel 528 is disposed along bottom face 516. Slidenut channel 528 is provided for coupling additional accessories, such as additional seals and/or coverings to rear bracket member 510 using a conventional fastener and sliding nut arrangement. In other words, a nut (not shown) may be slidably disposed within slidenut channel 528 such that the nut is retained by flanges 530 (FIG. 20) of slidenut channel 528. A fastener (not shown) can be used to couple an accessory to the nut in a predetermined position. Alternatively, an accessory can be provided having a complimentary engaging feature that can be slid within slidenut channel 528. Rear bracket member 510 may further comprise an upwardly turned hook member 532 extending from top face 514, which will be described herein.

Referring now to FIGS. 16-21, latching assembly 512 comprises a stanchion 534, a pivot block 536, and a latch member 538. Stanchion 534 may be injection molded and may include a pair of upwardly extending leg members 540 extending from a base member 542. Base member 542 can comprise a flange rail system 544 that is sized to be slidingly engaged within a corresponding channel 546 (FIG. 20) formed in side frame rail assembly 30. Accordingly, stanchion 534 can be slid within channel 546 to a predetermined position and retained in this predetermined position using a conventional fastener and/or slidenut system.

Each leg member 40 of stanchion 534 comprises an aperture 548 formed therethrough coaxially aligned with each other. Apertures 548 are sized to slidably receive a guide member or bolt 550 therethrough. Guide member 550 may include a fastener (not shown) disposed on an end 552 of guide member 550 to permit sliding movement of guide member 550 relative to stanchion 534 but resist disengagement of guide member 550 from stanchion 534. An opposing end 554 of guide member 550 may be fixedly coupled with pivot block 536. A spring member 558 may be disposed about a section of guide member 550 between stanchion 534 and pivot block 536. A first end 560 of spring member 558 may be received within a counter bore 562 formed about aperture 548 within one of the leg members 540 of stanchion 534. An opposing end 563 of spring member 558 may engage pivot block 536 to urge pivot block 536 away from stanchion 534. In operation, spring member 558 may, at least in part, urge rear bracket member 510 away from head rail assembly 26, thereby tightly drawing stretchable fabric cover 22.

Figure 20:
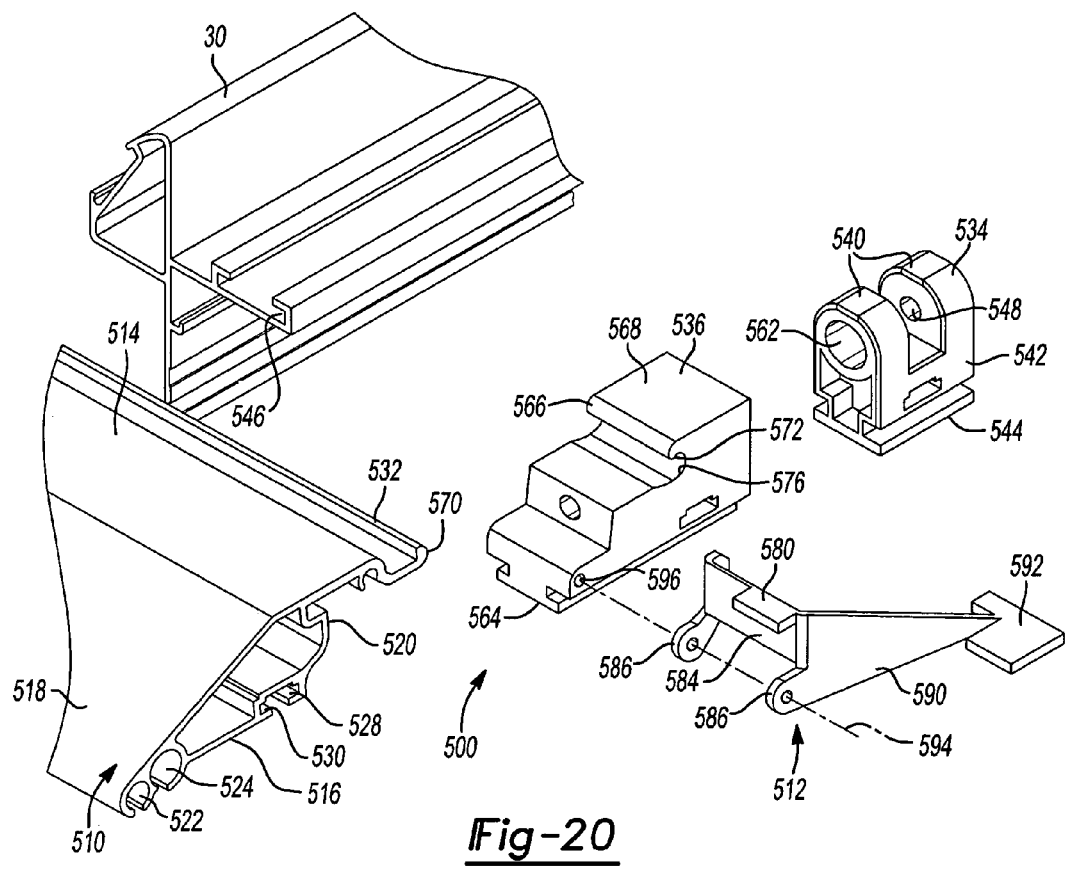
FIG. 20 is an exploded perspective view illustrating the rear frame assembly of FIG. 15.
Figure 21:
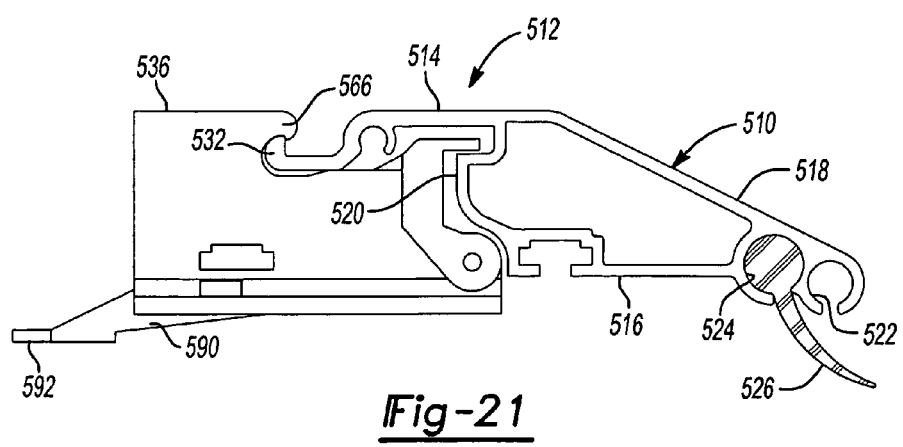
FIG. 21 is a side view illustrating the rear bracket member, pivot block, and locking pawl system in a down and locked position.

As seen in FIG. 20, pivot block 536 comprises a flange rail system 564 that is sized to be slidingly engaged within corresponding channel 546 formed inside frame rail assembly 30. Accordingly, pivot block 536 can be slid within channel 546 in response to the urging force exerted by spring member 558. In other words, in some embodiments, pivot block 536 can freely slide within channel 546 as needed. In some embodiments, pivot block 536 may comprise a slidenut channel 565 that is sized to receive a nut (not shown) therein such that the nut may be coupled with a fastener (not shown) to fixedly mount pivot block 536 within channel 546.

Figure 18:
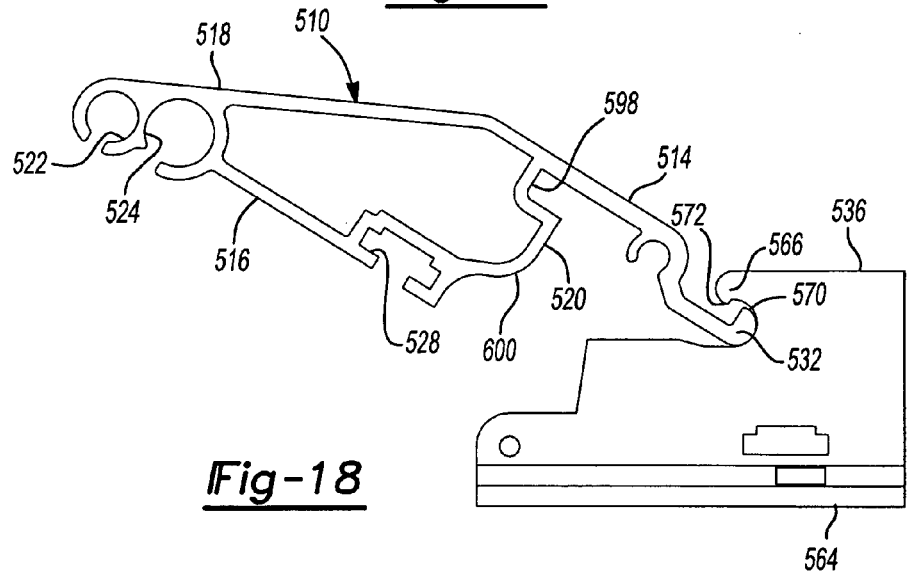
FIG. 18 is a side view illustrating a rear bracket member and a pivot block in an initial position.
Figure 19:
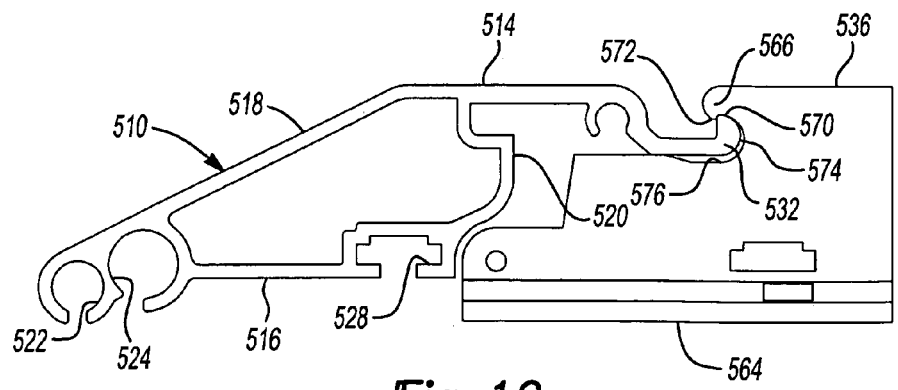
FIG. 19 is a side view illustrating the rear bracket member and the pivot block in a down and locked position.

Pivot block 536 further comprises a downwardly turned hook member 566 extending from a top face 568. Downwardly turned hook member 566 is sized and shaped to engage and receive upwardly turned hook member 532 of rear bracket member 510. As can be seen in FIGS. 18 and 19, a distal end 570 of upwardly turned hook member 532 can be captured by a distal end 572 of downwardly turned hook member 566 as rear bracket member 510 is rotated into a down and locked position (FIG. 19). Additionally, a bull nose portion 574 of upwardly turned hook member 532 can engage and ride along a concave portion 576 of downwardly turned hook member 566 to provide a smooth transition between the initial insertion position (FIG. 18) and the down and locked position (FIG. 19). It should be appreciated that the interconnection of downwardly turned hook member 566 and upwardly turned hook member 532 provides a positive and fixed position between rear bracket member 510 and pivot block 536 in a fore-aft direction of pickup truck 10, yet permits lateral movement of rear bracket member 510 relative to pivot block 536 in the cross-vehicle direction. This encourages proper alignment of tonneau system 12.

Figure 16:
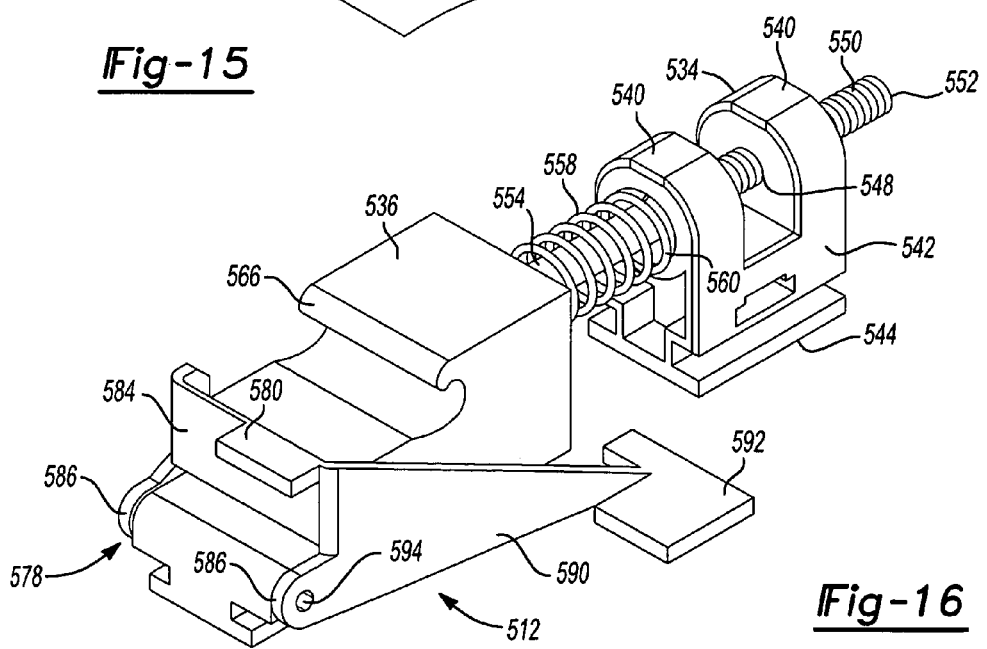
FIG. 16 is a perspective view illustrating a latching assembly.
Figure 17:
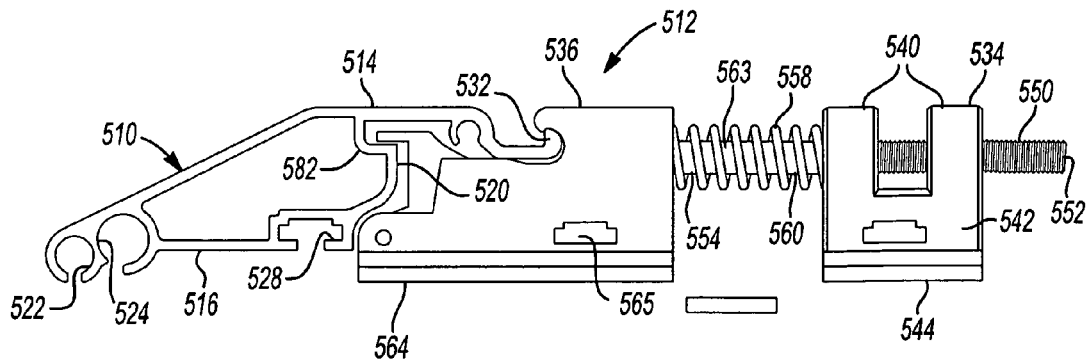
FIG. 17 is a side view illustrating the latching assembly.

To retain rear bracket member 510 in the down and latched position, a locking pawl system 578 is provided having a latch pawl 580 selectively engageable with a latch feature 582 (FIG. 17) formed in rear bracket member 510. As seen in FIG. 16, latch pawl 580 comprises a pawl face 584, a pair of leg members 586 extending from pawl face 584, latch pawl 580 extending from pawl face 584, and an extension arm 590 extending from pawl face 584 and terminating at a finger portion 592. Latch pawl 580 is adapted to be pivoted about an axis 594 extending through leg members 586 and an aperture 596 (FIG. 20) formed in pivot block 536. Latch pawl 580 may be spring biased into a locked position. Latch pawl 580 is sized to be received within latch feature 582. In some embodiments, latch feature 582 may comprise a ledge or other cut-out 598 (FIG. 18) operable to engage latch pawl 580 when in a locked position. Alternatively, such arrangement would permit free rotation of rear bracket member 510 relative to pivot block 536 when latch pawl 580 is disengaged from latch feature 582.

In operation, rear bracket member 510, having stretchable fabric cover 22 disposed thereabout and retained by rod member 54 and cover retaining slot 522, can be lifted to reveal cargo box 13 of pick-up truck 10. However, to retain and lock rear bracket member 510 in a down and locked position, rear bracket member 510 is first engaged with pivot block 536 such that upwardly turned hook member 532 of rear bracket member 510 is received with downwardly turned hook member 566 of pivot block 536 (FIG. 18). Rear bracket member 510 is then pivoted downwardly such that top face 514 of rear bracket member 510 is generally planar with top face 568 of pivot block 536. As rear bracket member 510 pivots about pivot block 536, latch pawl 580 can engage and ride along a curved portion 600 (FIG. 18) of latching face 520 of rear bracket member 510. In this regard, latch pawl 580 will cam along curved portion 600 until being received within latch feature 582, thereby latching rear bracket member 510 relative to pivot block 536. Alternatively, finger portion 592 may be depressed such that latch feature 582 is rotated about axis 594, thereby retracting latch pawl 580 from contact with latching face 520 of rear bracket member 510. In this regard, rear bracket member 510 can be rotated downward into the down position and finger portion 592 can be released to urge latch pawl 580 into locking engagement with latch feature 582.

Figure 25:
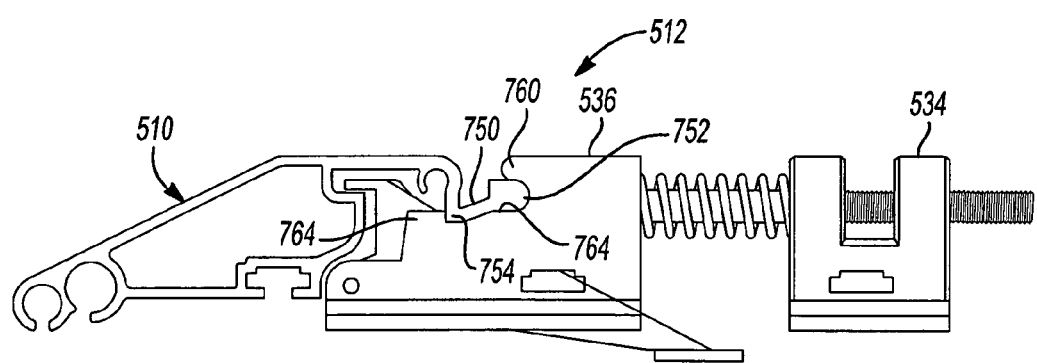
FIG. 25 is a side view illustrating a latching assembly according to another embodiment.
Figure 26:
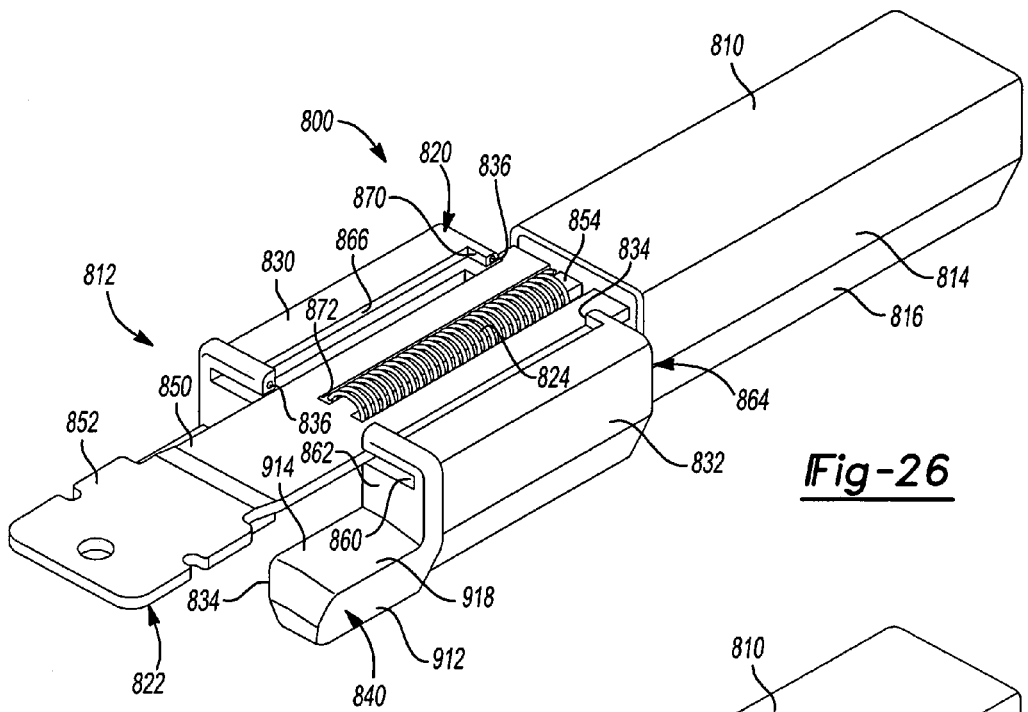
FIG. 26 is an exploded perspective view illustrating a vehicle bow member according to another embodiment.
Figure 27:
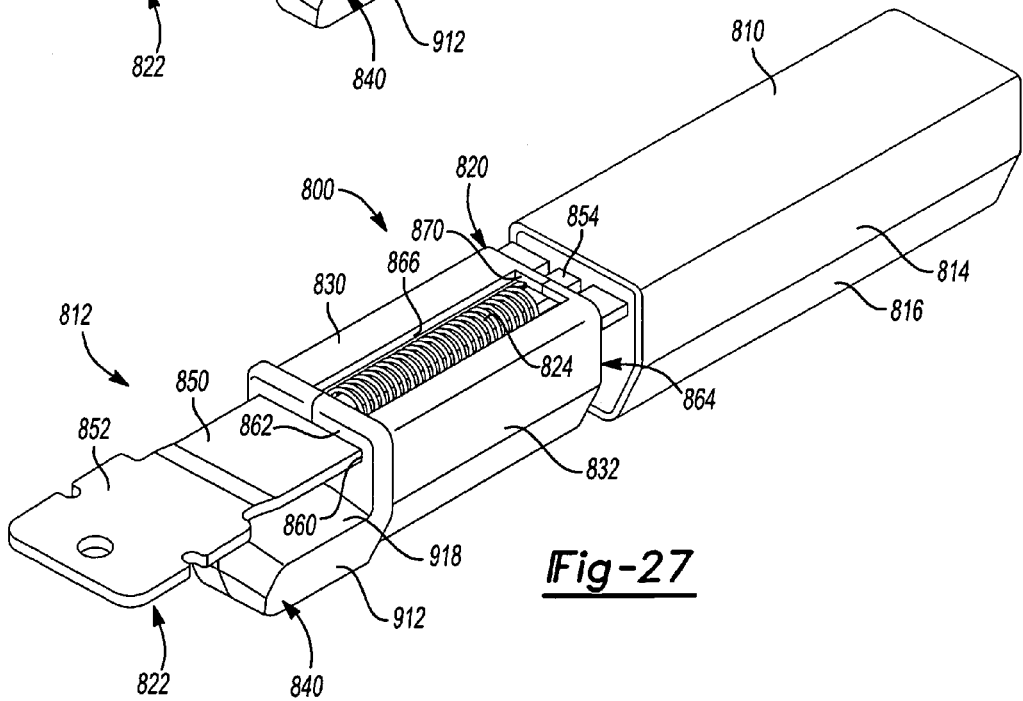
FIG. 27 is a partially exploded perspective view illustrating the bow member.

With reference to FIG. 25, rear bracket member 510 may alternatively be configured with an end member 750 in the place of hook member 532. End member 750 includes a bull nose portion 752 and a stop shoulder 754. Furthermore, pivot block 536 may alternatively be configured with a protruding member 760 in place of hook member 566, a concave portion 762 of protruding member 760, and a catch member 764. Catch member 764 extends outwardly at an end of concave portion 762 opposite protruding member 760. Bull nose portion 752 of end member 750 can engage and ride along concave portion 762 of protruding member 760 to provide a smooth transition between various positions of rear bracket member 510. In a down and locked position as seen in FIG. 25, stop shoulder 754 of end member 750 engages catch member 764 of pivot block 536. It should be appreciated that this engagement of stop shoulder 754 and catch member 764 provides a positive and fixed position between rear bracket member 510 and pivot block 536 in a fore-aft direction of pickup truck 10, yet permits lateral movement of rear bracket member 510 relative to pivot block 536 in the cross-vehicle direction. This encourages proper alignment of tonneau system 12.

Figure 34:
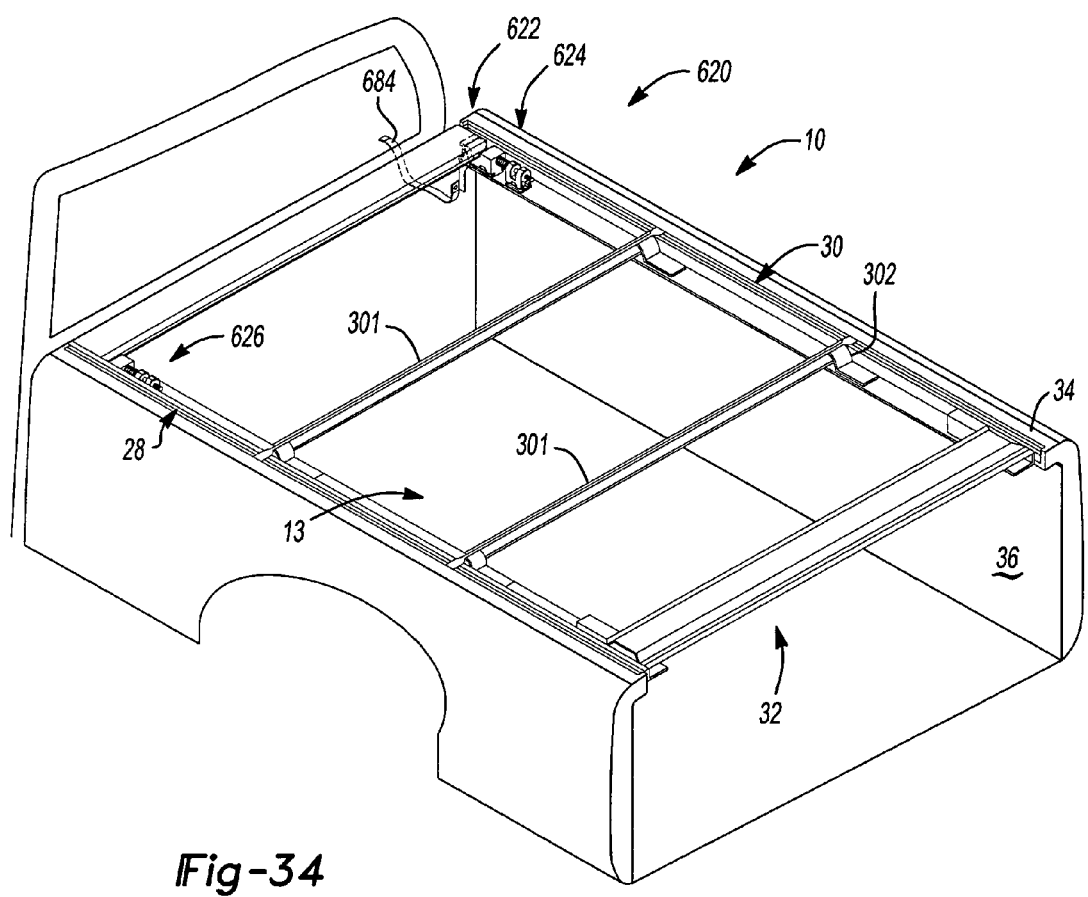
FIG. 34 is a perspective view illustrating the pickup truck having another embodiment of the tonneau cover system according to the principles of the present invention with portions removed for clarity.
Figure 35:
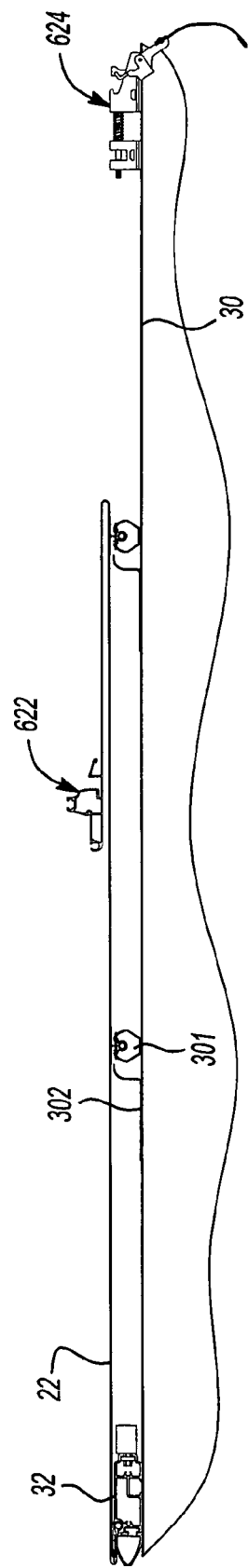
FIG. 35 is a cross section view illustrating the tonneau cover system of FIG. 34 with the front bracket unlatched and the front portion of the tonneau cover folded rearward.

With reference to FIGS. 34-39, an alternative frame rail assembly 620 will be described in detail. It should be noted that frame rail assembly 620 can be used in place of either head rail assembly 26 or rear frame rail assemblies 32, 500. Accordingly, frame rail assembly 620 may be used in place of head rail assembly 26 as shown to provide temporary access to a front portion of front cargo box 13 without the necessity of unsecuring the remaining portions of fabric cover 22. In view of the substantial similarity in structure and function of the components associated with frame rail assembly 620 with respect to frame rail assemblies 26, 32, 500, like reference numerals are used hereinafter and in the drawings to identify like components, while new reference numerals are used to identify those components that have been modified or added. As illustrated in FIG. 34, frame rail assembly 620 generally comprises an extruded bracket member 622, a first latching assembly 624, a second latching assembly 626, and frame rail assemblies 28, 30.

Bracket member 622 is similar in construction to bracket members 200, 400, 510 except for the features that will now be described. Bracket member 622 and latching assemblies 624, 626 work together to define a system that captures and retains bracket member 622 relative to latching assemblies 624, 626 yet permits lateral movement of bracket member 622 relative to latching assemblies 624, 626. Referring now to FIGS. 36-39, bracket member 622 is preferably constructed of a light-weight, corrosion resistant material, such as aluminum and adapted to position and secure one end of fabric cover 22. Bracket member 622 generally comprises a pivot member 630, a top face 632, a bottom face 634, a sloped face 636 disposed between top face 632 and bottom face 634, and a latching feature 638. Top face 632 is generally disposed in planar relationship with a top section of latching assembly 624, as will be described herein. Bottom face 634 is disposed parallel to, but spaced offset from, a top portion of front wall 14. It is anticipated that fabric cover 22 will extend along top face 632, down sloped face 636, and terminate at an intersection of sloped face 636 and bottom face 634. To this end, a cover retaining slot 640 extends longitudinally along a forward edge of bracket member 622. Cover retaining slot 640 is sized to receive rod member 54 and reliably retain fabric cover 22 in connection to bracket member 622 as previously described.

Pivot member 630 extends longitudinally along a rear edge of bracket member 622 and is adapted to position one end of bracket member 622 relative to latching assembly 624, as will be described herein. Pivot member 630 generally comprises a nose 642 and a rear face 644. Nose 642 is adapted to be received in a concave portion of latching assembly 624 and to allow bracket member 622 to pivot relative to latching assembly 624, as will be described. Nose 642 is also adapted to snugly engage a concave portion of latching assembly 624 when bracket member 622 is positioned at a closed position and thereby fix the vertical position of the rear edge of bracket member 622 and prevent forward movement of bracket member 622. Rear face 644 is disposed opposite and forward nose 642 and adapted to engage a vertical face of latching assembly 624 when bracket member 622 is positioned in a closed position and thereby prevent rearward movement of bracket member 622. Accordingly, nose 642 and rear face 644 work together to fix the fore-aft and vertical position of the rear edge of bracket member 622, yet permit lateral movement of bracket member 622 relative to latching assembly.

Latching feature 638 is generally a planar surface disposed beneath top face 632 to conceal a portion of the latching assembly that secures bracket member 622. Latching feature 638 is offset from a portion of latching assembly 624 and is adapted to receive a portion of latching assemblies 624, 626 as will be described. Latching feature 638 and latching assemblies 624, 626 work together to secure bracket member 622 in a closed position, yet allow bracket member 622 to be unsecured and removed as may be needed.

Bracket member 622 further comprises a seal groove 646 and a slidenut channel 648. Seal groove 646 is disposed adjacent cover retaining slot 640 on bottom face 634 and is adapted to receive seal member 526 as previously described. Similarly, slidenut channel 648 is disposed along bottom face 634 and is provided for coupling additional accessories, such as additional seals and/or coverings to bracket member 622 as previously described.

Referring to FIG. 34, latching assembly 624 is shown to be associated with frame rail assembly 30, while latching assembly 626 is shown to be associated with frame rail assembly 28. As such, it should be understood that latching assemblies 624, 626 are identical in construction, yet are mirror images of one another. In the interest of brevity, only latching member 624 will be discussed in detail. However, it should be appreciated that while two latching assemblies are shown to be associated with frame rail assembly 620, frame rail assembly 620 may alternately comprise a single latching assembly associated with one frame rail assembly, preferably latching assembly 626 associated with frame rail assembly 28 on the drivers side, and another means of securing bracket member 622 on the other side as provided herein. Specifically, a pivot block as will be described may be used in place of latching assembly 624 to fixedly position bracket member 622 on one end, while latching assembly 626 is used to releasably secure bracket member 622 on the other end. Such may be desired to reduce the cost and simplify the operation of frame rail assembly 620.

Referring to FIGS. 36-39, latching assembly 624 generally comprises stanchion 534, a pivot block 650, and a latching member 652. Stanchion 534 retains the features and functions previously described. Accordingly, stanchion 534 is adapted to be slidably positioned within channel 546 of frame rail assembly 30 and to bias pivot block 650 forward to tightly draw fabric cover 22 when bracket member 622 is at a closed position.

Figure 38:
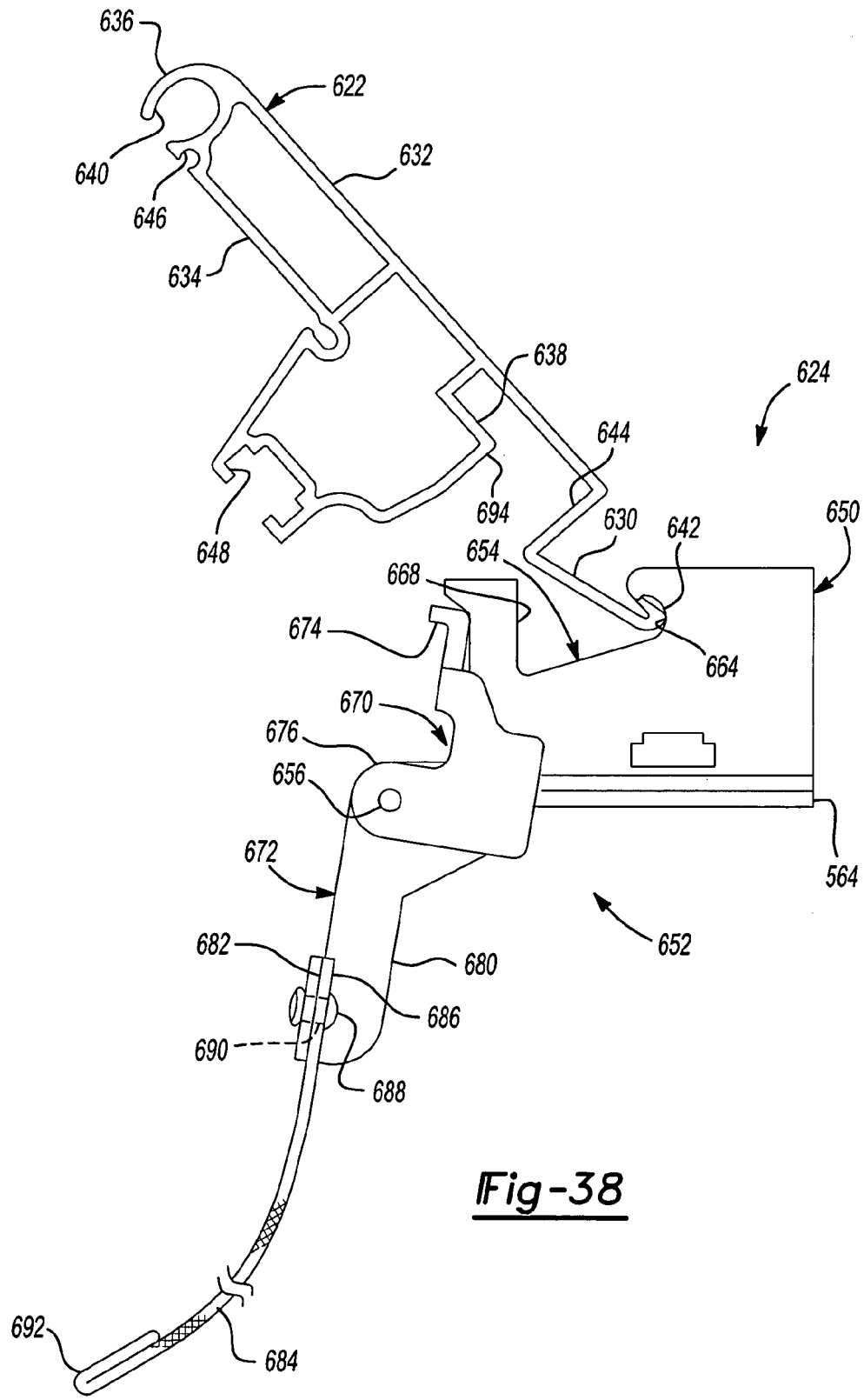
FIG. 38 is a side view illustrating a portion of the latching assembly of FIG. 34 in a partially unlatched position.
Figure 39:
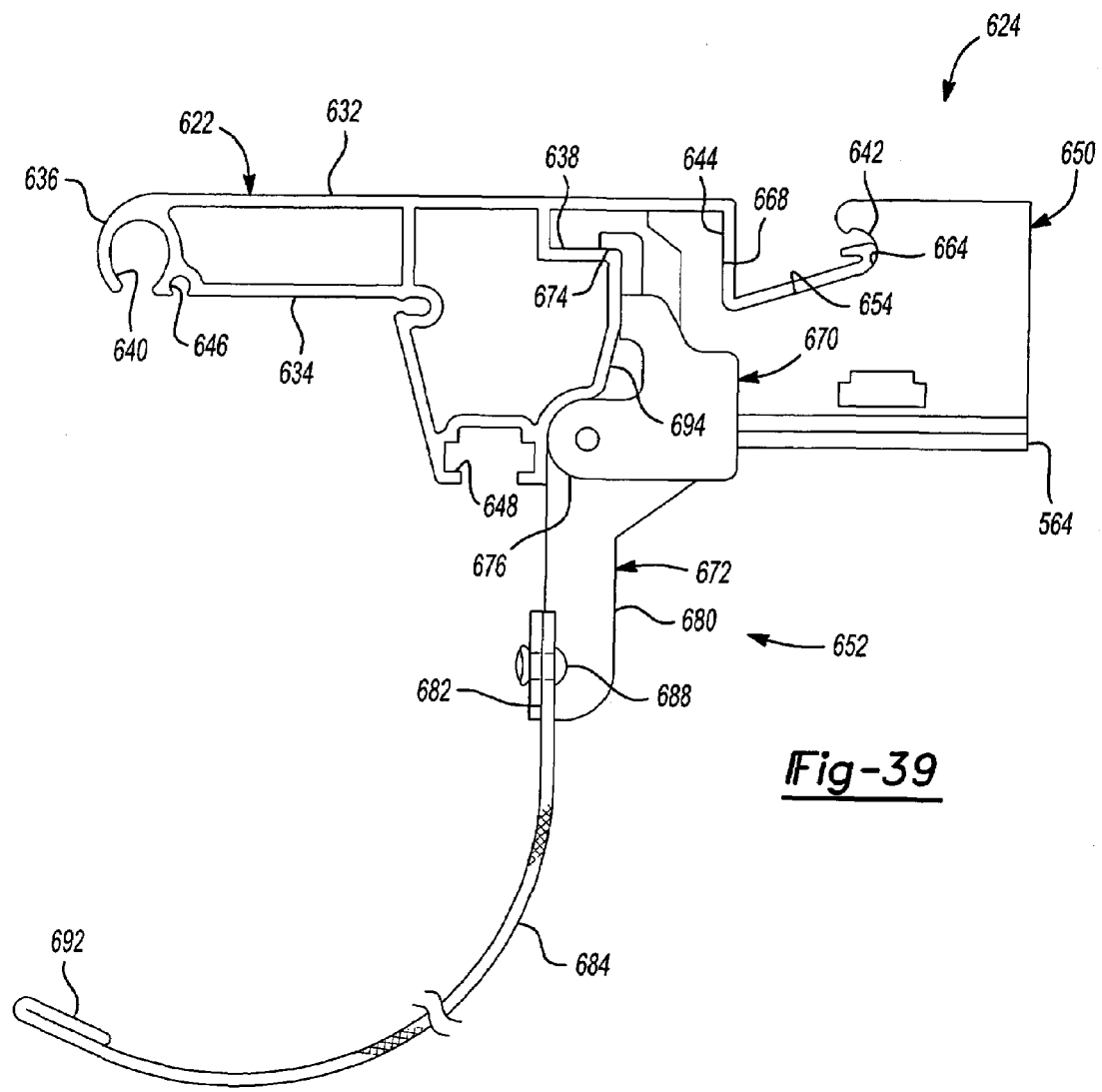
FIG. 39 is a side view illustrating a portion of the latching assembly of FIG. 34 in a latched position.

Pivot block 650 generally comprises flange rail system 564, a socket member 654, and a latch pivot member 656. Flange rail system 564 retains all of the features and functions previously described. Accordingly, flange rail system is adapted to slidingly engage channel 546 of frame rail assembly 30 and thereby allow pivot block 650 to freely slide or be fixedly mounted within channel 546 as may be desired. Socket member 654 is disposed beneath a top face 662 and includes a concave face 664 and a rear face 668, which oppose one another and extend laterally across pivot block 650. Concave face 664 is generally curved in shape and is adapted to receive nose 642 of bracket member 622 and provide a smooth transition between the initial insertion position (FIG. 38) and the down and locked position (FIG. 39). Additionally, concave face 664 is sized and shaped to snugly engage nose 642 of bracket member 622 to fix the vertical position of the rear edge of bracket member 622 when bracket member 622 is positioned at a closed position. Rear face 668 is generally planar in shape and adapted to snugly engage face 644 of bracket member 622 when bracket member 622 is positioned at a lower position. In this manner socket member 654 works together with pivot member 630 to fix the fore-aft position of bracket member 622 when bracket member 622 is positioned at a closed position. Latch pivot member 656 is adapted to rotatably support latching member 652.

Figure 36:
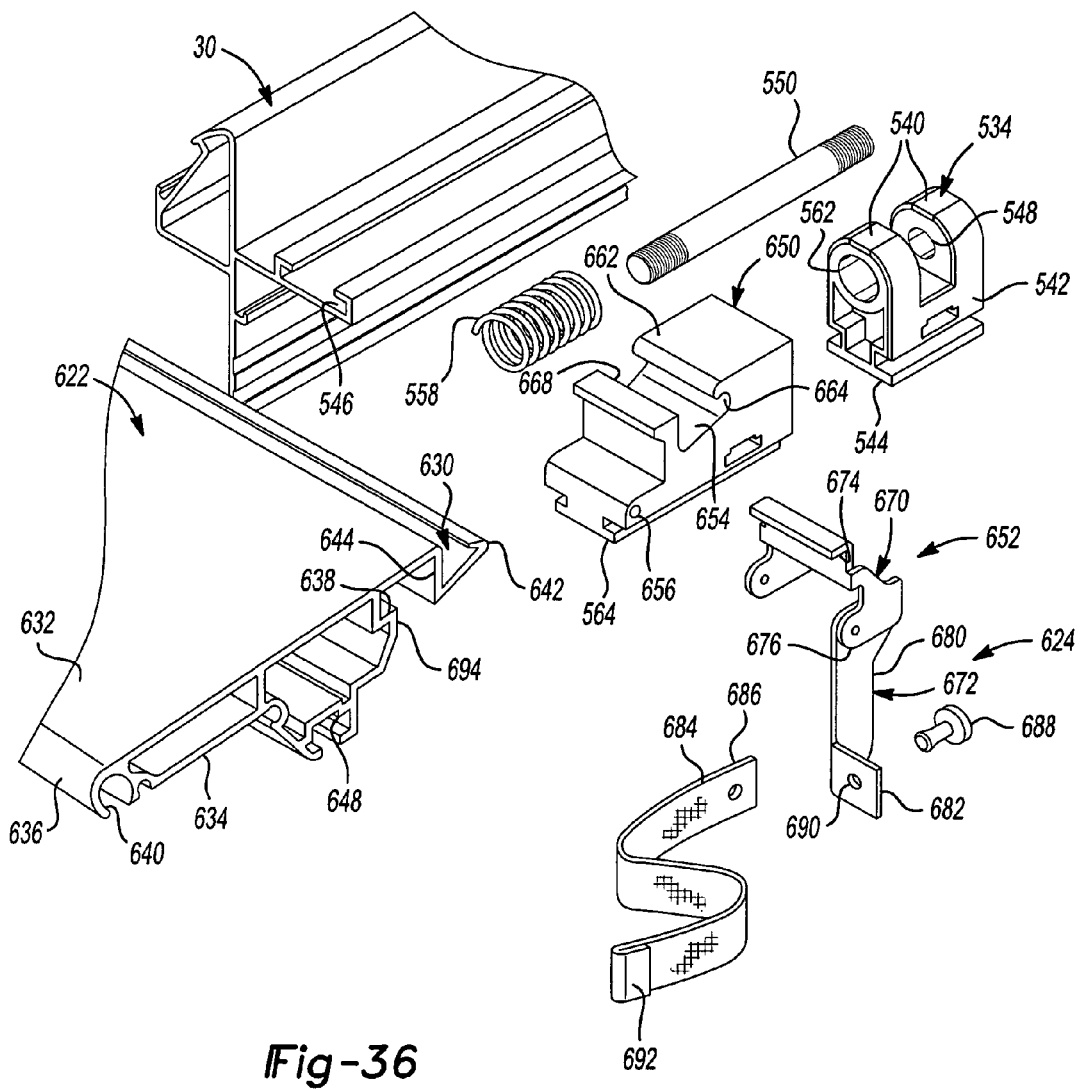
FIG. 36 is an exploded view illustrating the frame rail assembly of FIG. 34.
Figure 37:
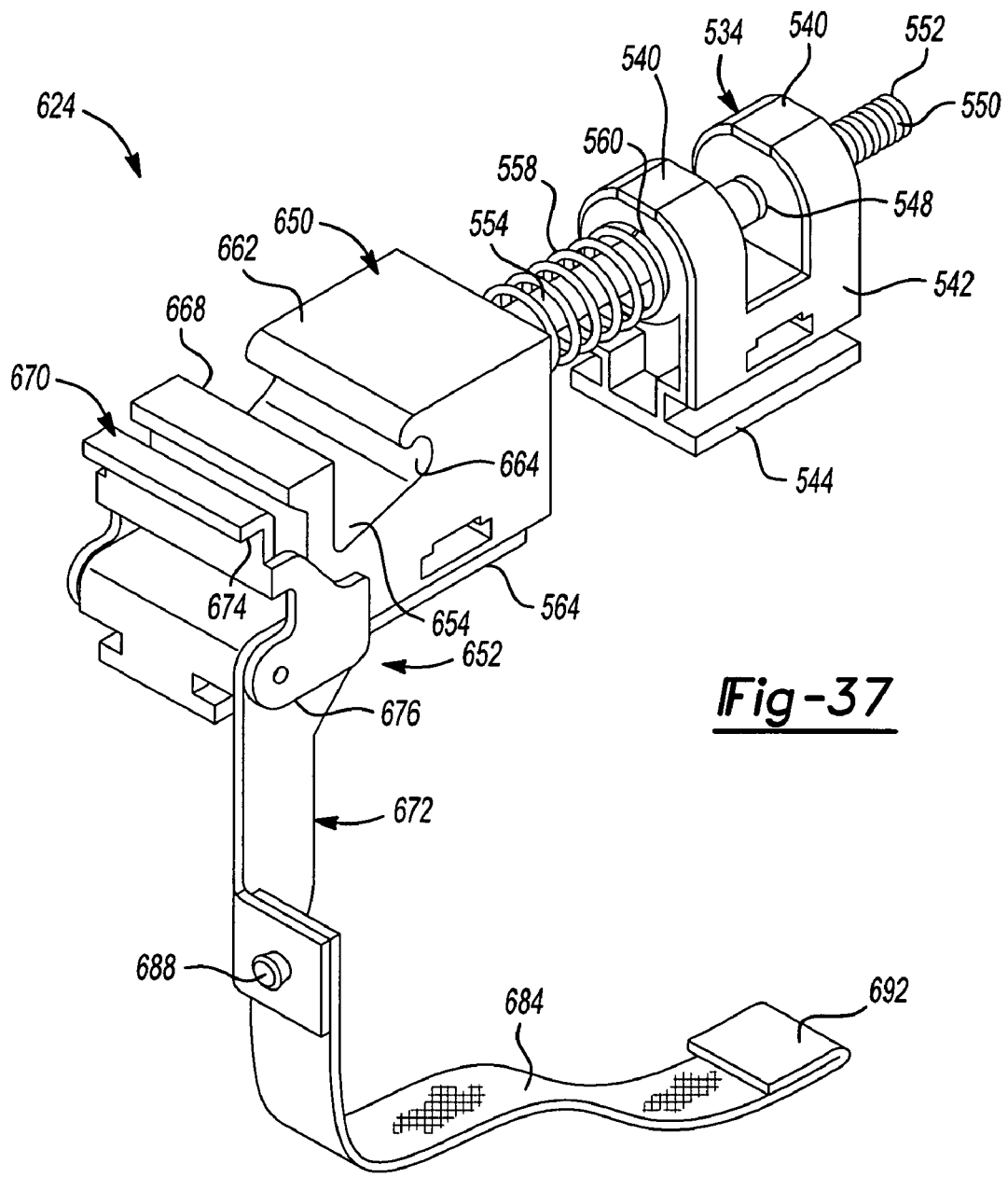
FIG. 37 is a perspective view illustrating the latching assembly of FIG. 34.

Latching member 652 is operable to releasably secure bracket member 622 in a down and latched position and comprises a latch pawl 670 and lever assembly 672. Latch pawl 670 and lever assembly 672 are preferably formed of a metal with a corrosion resistant coating and are rotatably supported by pivot member 656 of pivot block 650. Additionally, latch pawl 670 and lever assembly 672 are mechanically coupled to one another and work together to releasably secure bracket member 622 in a down and latched position. While latch pawl 670 and lever assembly 672 may be directly coupled together as shown, it should be appreciated by one skilled in the art that latch pawl 670 and lever assembly 672 may be coupled together by a linkage assembly operable to cause the desired movement of latch pawl 670 as lever assembly 672 is rotated. As best seen in FIG. 36, latch pawl 670 comprises a finger 674 extending from a pair of leg members 676. Finger 674 is adapted to be received by latching feature 638 as latching member 652 is rotated between an unlatched and latched position. Additionally, finger 674 is adapted to engage latching feature 638 and thereby secure bracket member 622 when latching member 652 is positioned at a latched position. Leg members 676 are adapted to be rotatably supported by pivot member 656 and mechanically coupled to lever assembly 672, as previously described. It should be appreciated that latch pawl 670 may be spring biased into a latched position (not shown). Lever assembly 672 is operable to rotate latch pawl 670 and comprises an extension arm 680 extending from latch pawl 670 and terminating in a finger portion 682 adapted to secure one end of a latch strap 684. To this end, latch strap 684 has a first end 686 that is coupled to finger portion 682 by a rivet 686 extending through a hole 690 in finger portion 682. Latch strap 684 is preferably constructed of a durable fabric, such as nylon, and made to a sufficient length to extend from finger portion 682, under bracket member 622, to the exterior of cargo box 13. Latch strap 684 further includes a second end 692 which is adapted to allow latch strap 684 to be pulled on to rotate latch pawl 670 from a latched position to an unlatched position. Additionally second end 692 is adapted to prevent latch strap 684 from sliding under bracket member 622 into the interior of cargo box 13 when bracket member 622 is in a down and latched position. Accordingly, latch strap 684 is shown to have a second end 692 which is folded over and sewn to the body of latch strap 684.

As previously noted, pivot block 650 may be used in place of latching assembly 624 to position bracket member 622 with respect to frame rail assembly 30 as will be described. As such, pivot block 650 retains the features and functions previously described and may be used in place of latching assembly 624 to reduce the cost and simplify the operation of frame rail assembly 620.

In operation, bracket member 622, having stretchable fabric cover 22 disposed thereabout and retained by rod member 54 and cover retaining slot 640, can be positioned to releasably secure a front portion of fabric cover 22 and lifted to reveal the front portion of cargo box 13 of pickup truck 10. To secure fabric cover 22, bracket member 622 is first engaged with pivot block 650 such that nose 642 is received within concave face 664 (FIG. 38). Next, bracket member 622 is pivoted downwardly such that top face 632 of bracket member 622 is generally planar with top face 662 of pivot block 650. As bracket member 622 pivots about pivot block 650, latch pawl 670 can engage and ride along a curved portion 694 of latching feature 638 until it is fully received within latching feature 638, thereby securing bracket member 622 relative to pivot block 650. To release and lift the front portion of fabric cover 22, latch strap 684 may be pulled such that latch pawl 670 is rotated about latch pivot member 656, thereby retracting latch pawl 670 from contact with latching feature 638 of bracket member 622. Next, the portion of fabric cover 22 affixed to bracket member 622 may be lifted by grasping bracket member 622 and placing it rearward on top of tonneau system 12. In this manner, frame rail assembly 620 may be used to temporarily expose a front portion of cargo box 13 without unsecuring the remaining portions of fabric cover 22 secured to other retaining members as will now be described.

Figure 6:
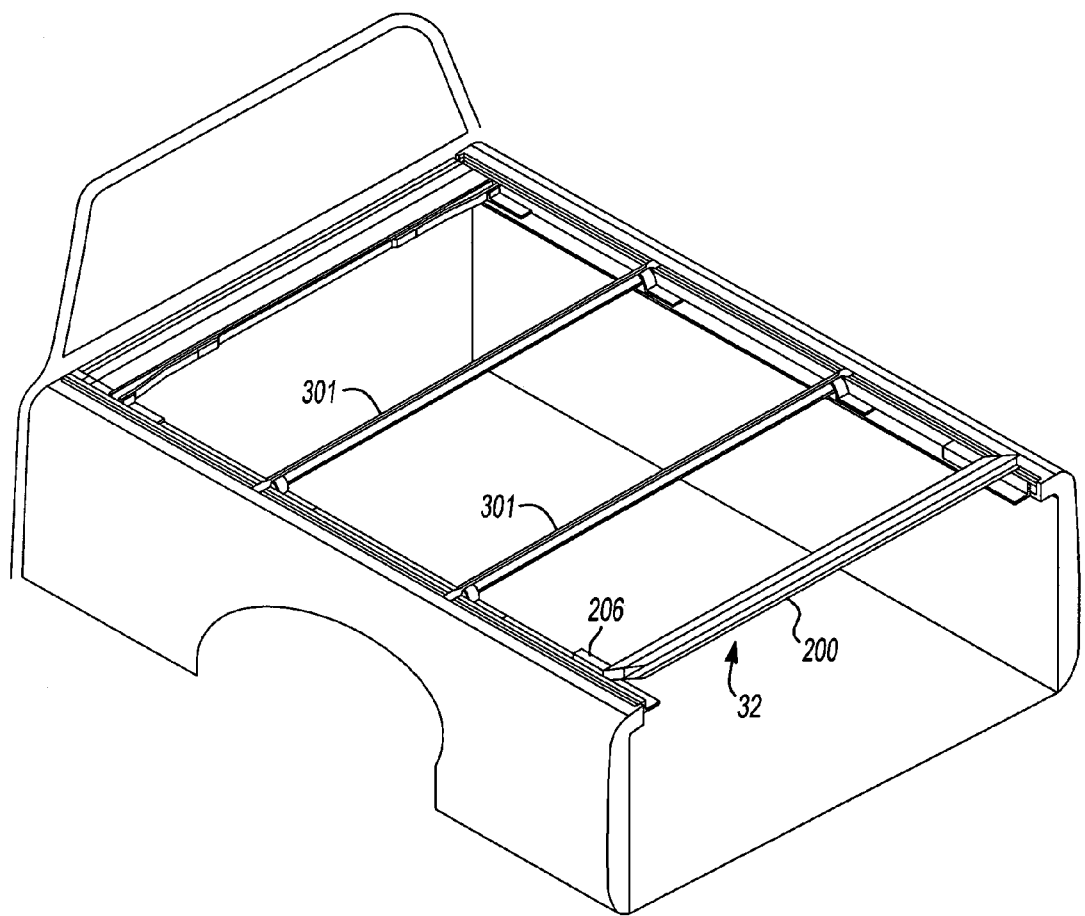
FIG. 6 is a perspective view illustrating the pickup truck having the tonneau cover system with portions removed for clarity and the rear frame rail assembly in a raised position.
Figure 7:
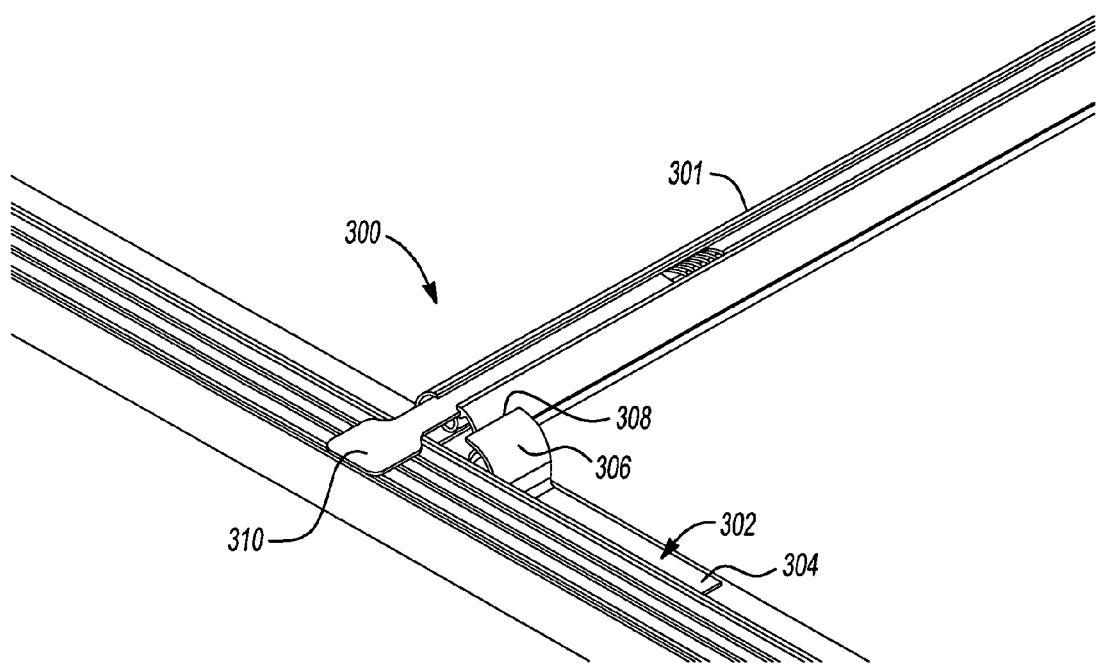
FIG. 7 is an enlarged perspective view illustrating the bow member and retaining bracket.

Turning now to FIGS. 6 and 7, it can be seen that tonneau system 12 further includes a retaining system 300 for retaining sections of fabric cover 22 located between head rail assembly 26 and rear frame rail assembly 32. As best seen in FIG. 6, retaining system 300 includes a plurality of cross vehicle bow members 301 operably coupled with fabric cover 22 and engaging retaining brackets 302 fixedly coupled to frame rail assembly 28, 30. Retaining brackets 302 may be of any shape or design; however, two possible configurations will be discussed herein.

With reference to FIGS. 6 and 7, retaining bracket 302 is illustrated as a generally sheet-like member shaped to define a generally planar section 304 and a receiving section 306. Planar section 304 is disposed adjacent frame rail assembly 28, 30 and fastened thereto via conventional means, such as fasteners. Receiving section 306, however, is shaped to receive a corresponding portion of vehicle bow member 301. That is, in the embodiment illustrated in FIGS. 6 and 7, vehicle bow member 301 is generally cylindrical in cross-section. Accordingly, receiving section 306 is generally cylindrical, concave in shape to readily receive and retaining vehicle bow member 301 therein. Receiving section 306 extends upward to an end 308, which is positioned relative to vehicle bow member 301 to generally prevent vehicle bow member 301 from disengaging with retaining bracket 302 in a vertical direction.

Vehicle bow member 301 is generally cylindrical in cross-section. Vehicle bow member 301 may define an enclosed tubular member or may be constructed of rolled aluminum, or other material. Preferably, vehicle bow member 301 further includes an optional paddle-shaped bow end 310 extending outwardly from vehicle bow member 301. Paddle-shaped bow end 310 overlaps a portion of frame rail assembly 28, 30. Paddle-shaped bow end 310 serves to push outwardly in a lateral direction (in the cross-vehicle direction) keeping the stretchable fabric cover 22 taunt. Paddle-shaped bow end 310 further biases the periphery of stretchable fabric cover 22 down to seal against frame rail assembly 28, 30. Frame rail assembly 28, 30 have alternating high and low sections that act as a labyrinthian seal.

Figure 8:
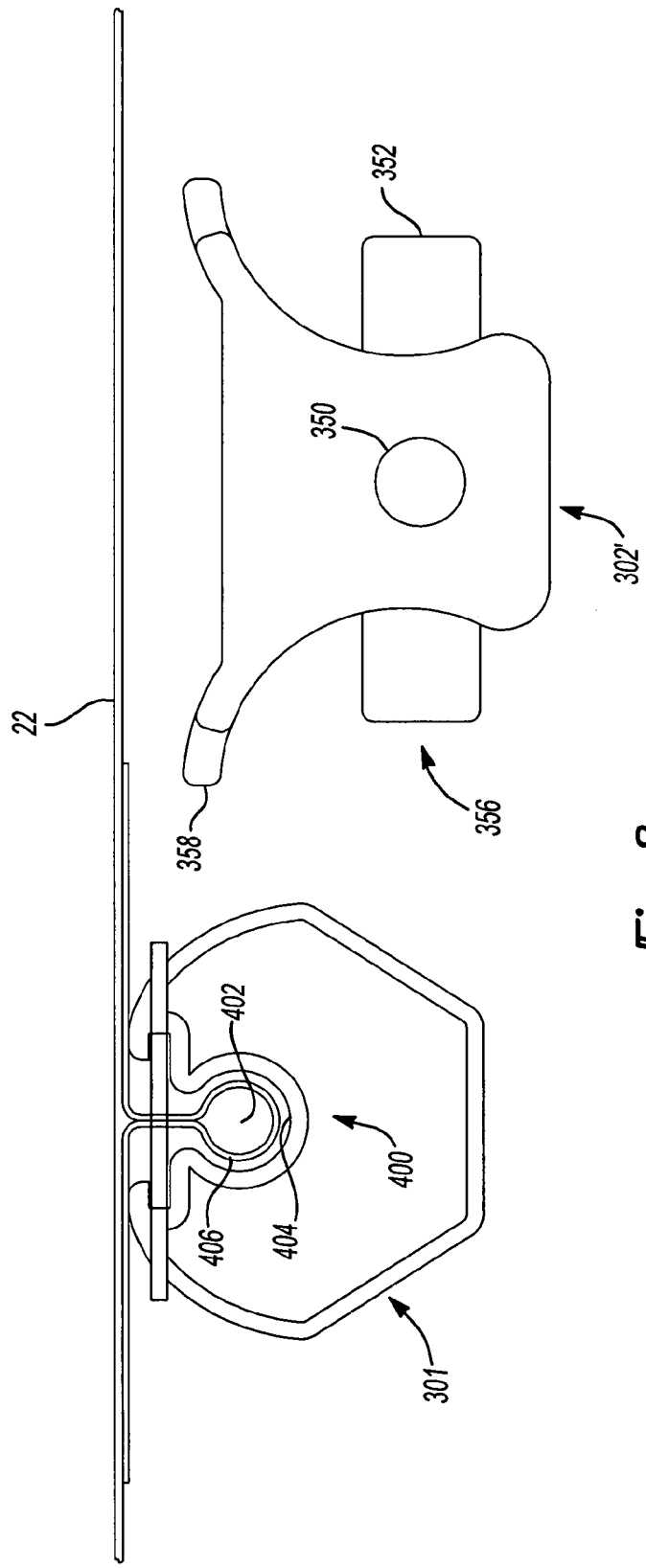
FIG. 8 is a side view illustrating the bow member and retaining block member in a released position.
Figure 9:
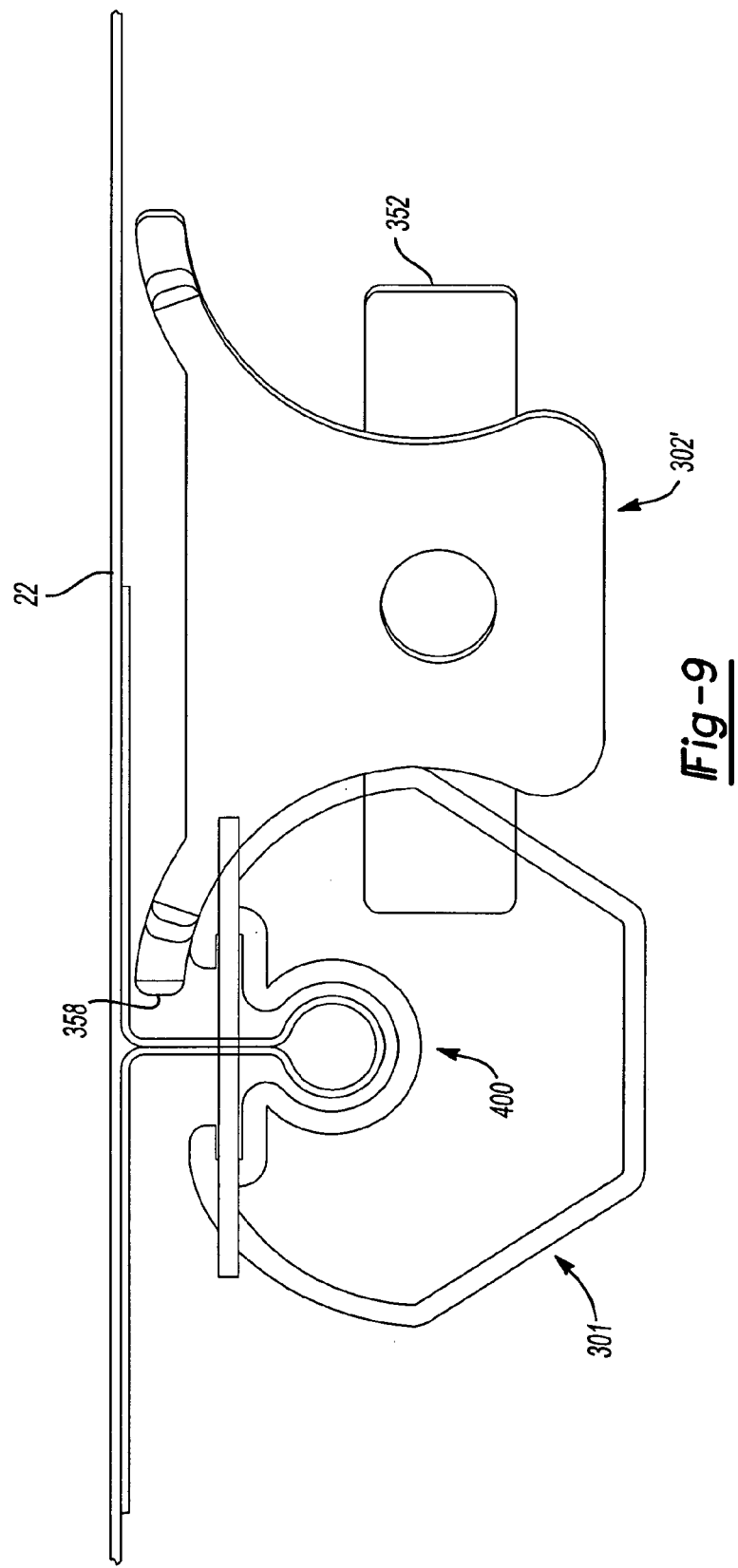
FIG. 9 is a side view illustrating the bow member and retaining block member in a retained position.
Figure 10:
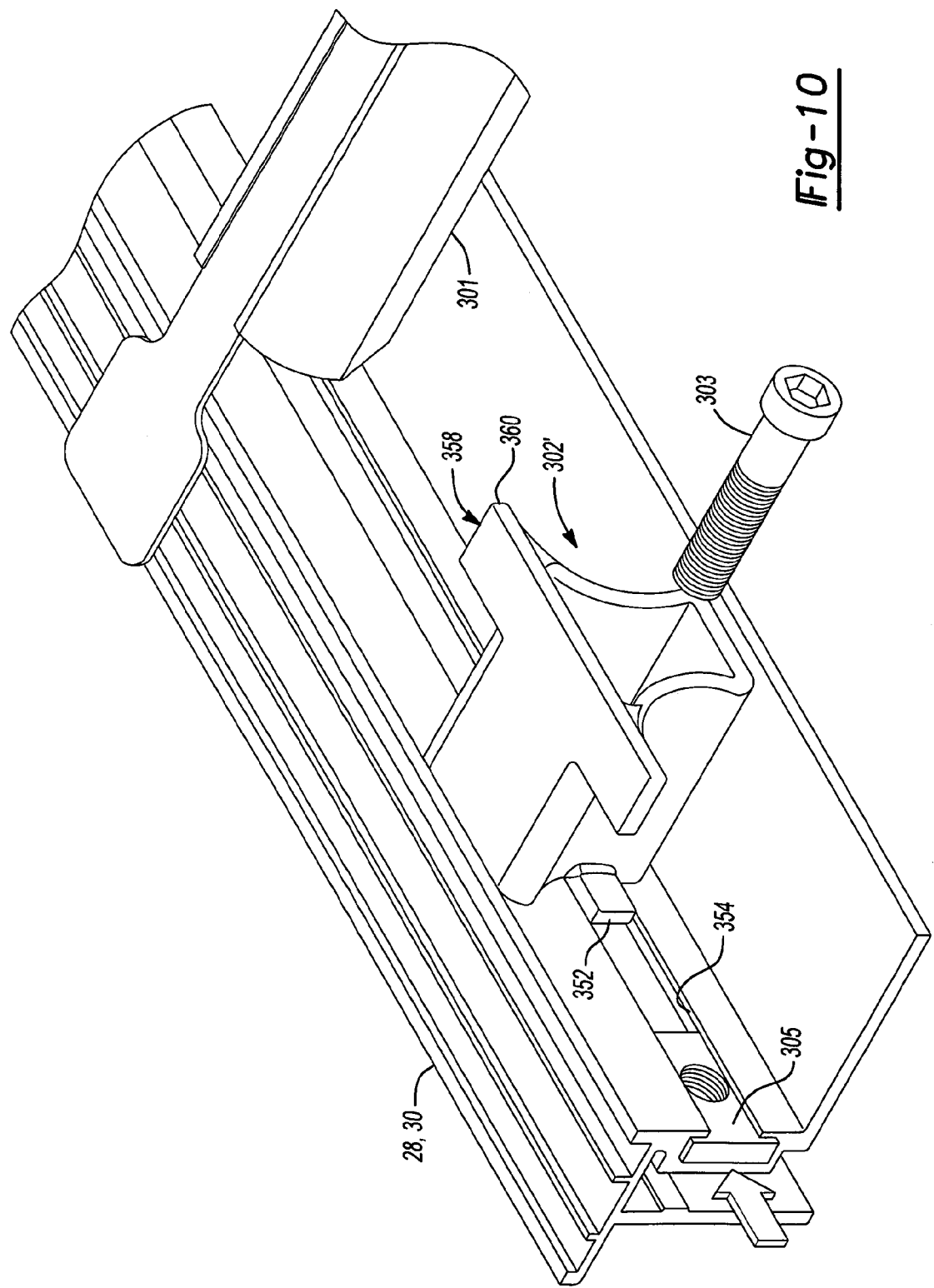
FIG. 10 is an enlarged perspective view illustrating the retaining block member.
Figure 11:
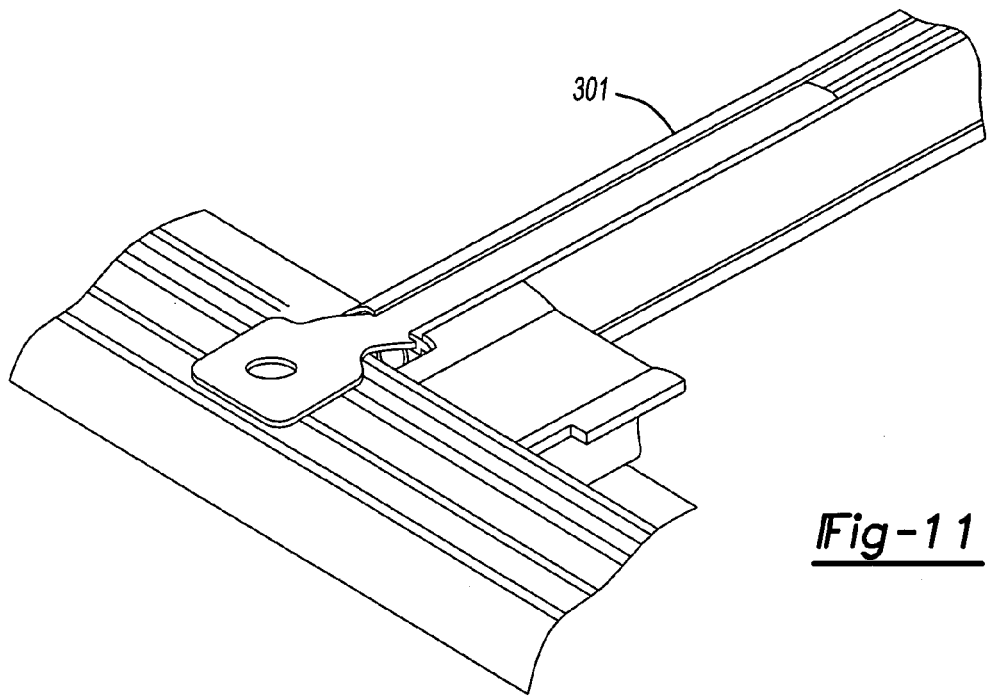
FIG. 11 is an enlarged perspective view illustrating the bow member in the retained position.
Figure 12:
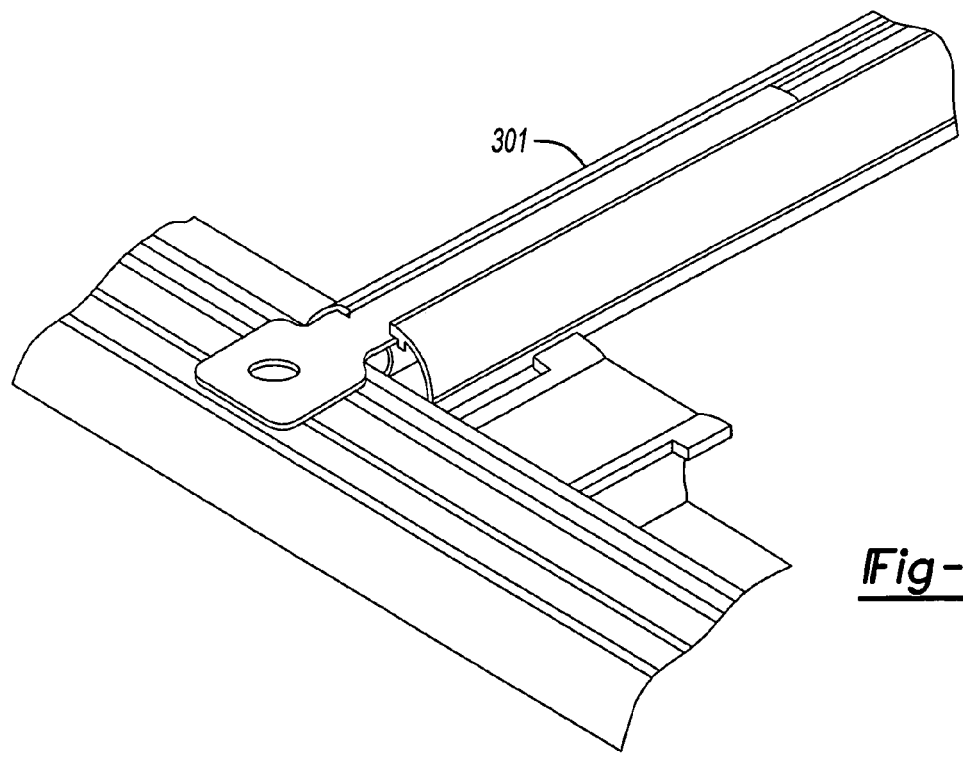
FIG. 12 is an enlarged perspective view illustrating the bow member in the released position.
Figure 15:
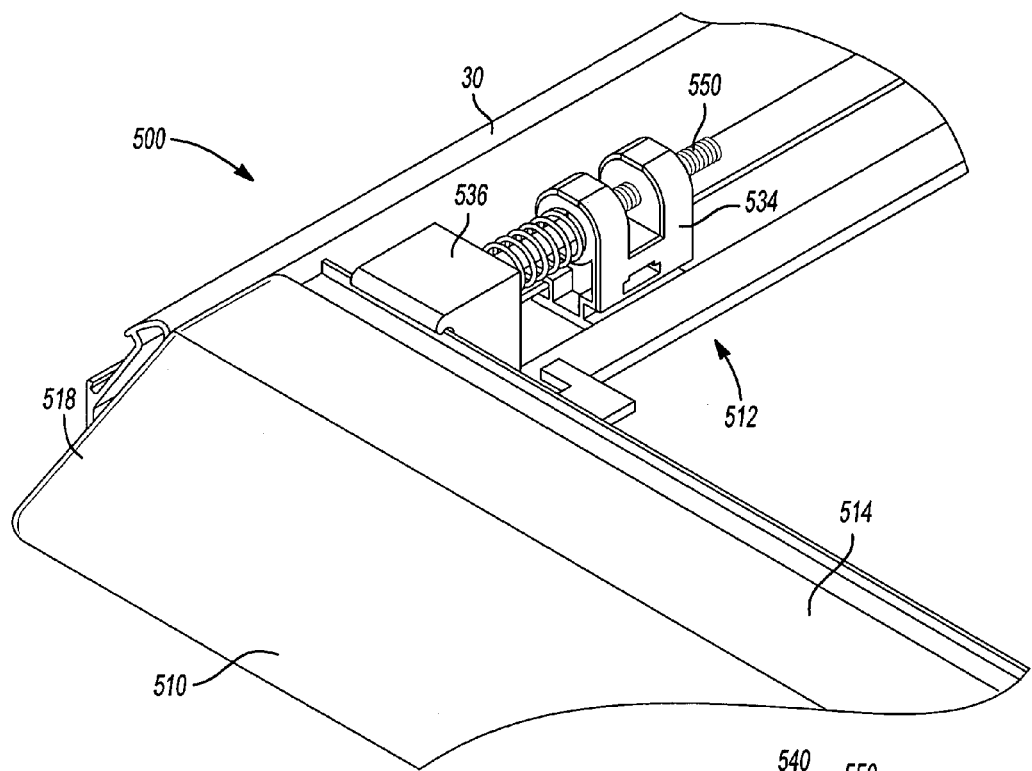
FIG. 15 is a perspective view illustrating a rear frame assembly according to another embodiment.

Alternatively, as seen in FIGS. 8-12, retaining bracket 302 may be made as a block member, generally indicated at 302'. Retaining block member 302' is preferably made of a Nylon or other plastic material and is injection molded. Retaining block member 302' is preferably fastened to frame rail assembly 28, 30 via a fastener 303 extending through an aperture 350 formed in retaining block member 302'. Fastener 303 engages a sliding bracket 305 received within frame rail assembly 28, 30. Retaining block member 302' further includes a tab member 352 that is sized to be slidably received within a channel 354 of frame rail assembly 28, 30. Tab member 352 and channel 354 cooperate to prevent, or at least, minimize rotation of retaining block member 302' to ensure proper positioning of retaining block member 302'. Retaining block member 302' further includes a receiving section 356, which is shaped to receive a corresponding portion of vehicle bow member 301. That is, in the embodiment illustrated in FIGS. 8-12, vehicle bow member 301 is generally cylindrical in cross-section. Accordingly, receiving section 356 is generally cylindrical, concave in shape to readily receive and retaining vehicle bow member 301 therein. Receiving section 356 extends upward to an end 358, which is positioned relative to vehicle bow member 301 to generally prevent vehicle bow member 301 from disengaging from retaining block member 302' in a vertical direction. More particularly, as seen in FIG. 10, end 358 may terminate at a single finger 360, if desired.

Turning now to FIGS. 13 and 14, it can be seen that vehicle bow member 301 is engaged and retained within receiving section 356 when rear bracket member 200 is lowered (see FIG. 13), while conversely vehicle bow member 301 is released and free to be raised when bracket member 200 is raised (see FIG. 14). It is worth noting that this operating is illustrated in FIGS. 13 and 14 in connection with retaining bracket 302 and retaining block member 302'.

As best seen in FIGS. 8 and 9, vehicle bow member 301 is coupled to fabric cover 22 through a coupling system 400. Coupling system 400 includes a rod or cord member 402 slidably received within a bow channel 404 extending longitudinally through vehicle bow member 301. Cord member 402 captures a portion 406 of fabric cover 22 simply by routing fabric cover 22 around cord member 402. The shape of bow channel 404 retaining cord member 402 therein, thereby preventing fabric cover 22 from disengaging from vehicle bow member 301. Most preferably, portion 406 of fabric cover 22 is sewn into fabric cover 22 to prevent migration of fabric cover 22 relative to cord member 402. It should be understood that this positive coupling of fabric cover 22 to vehicle bow member 301 (and the corresponding coupling of vehicle bow member 301 to either retaining bracket 302 or retaining block member 302') serves to retain and prevent rising of fabric cover 22 during vehicle travel.

With reference to FIGS. 26-33, alternative cross vehicle bow members 800 and a complementary alternative retaining system 802 will be described in detail. It should be appreciated that vehicle bow members 800 and retaining system 802 may have a similar general configuration across pickup truck 10 and tonneau system 12, as described above with reference to retaining system 300 and vehicle bow members 301.

Figure 31A:
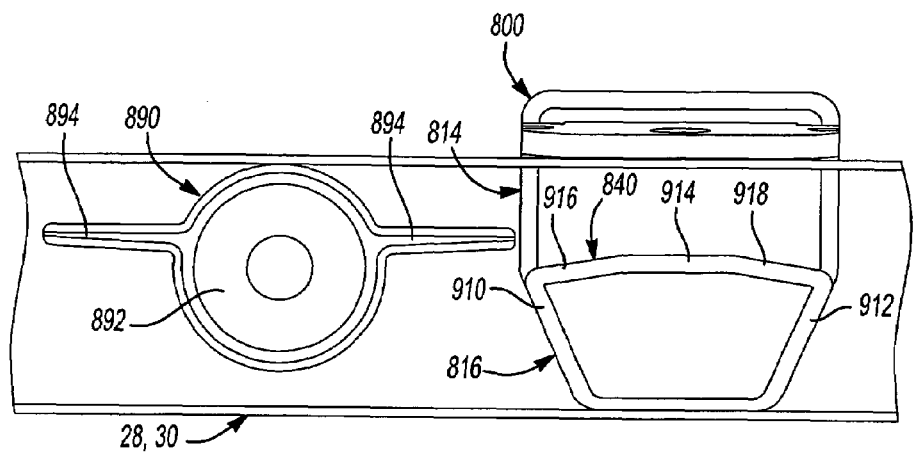
FIG. 31 is a side view illustrating the bow member and a retaining block member according to another embodiment in a released position.
Figure 31B:
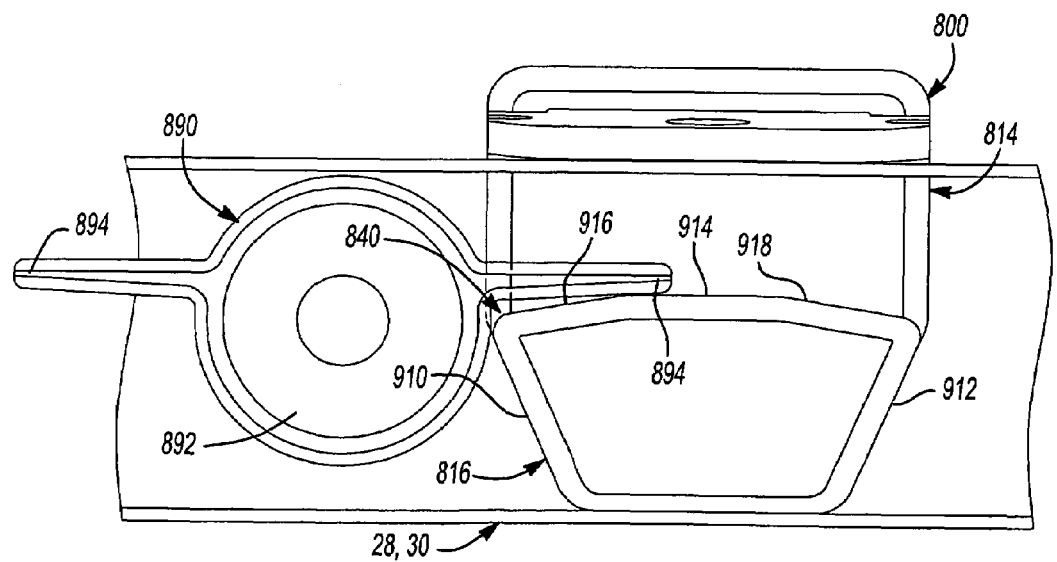

Vehicle bow member 800 is illustrated as a generally elongated assembly. Vehicle bow member 800 includes a main housing 810 and a bow end assembly 812 disposed in an end of main housing 810. As best seen in FIG. 31, main housing 810 has a hollow construction with a generally rectangular cross section including sidewalls 814 having tapered portions 816. Tapered portions 816 facilitate movement of vehicle bow member 800 relative to side frame rail assemblies 28, 30 and into engagement with retaining system 802. Main housing 810 may be constructed of aluminum.

With particular reference to FIGS. 26-30, bow end assembly 812 includes a bow end housing 820, a plunger 822, and a spring 824. Bow end housing 820 has a clam shell construction including a first component 830 and second component 832. First and second components 830, 832 include complementary pins 834 and holes 836 which engage each other and positively fix the positions first and second components 830, 832 relative to each other. When bow end assembly is disposed into main housing 810 (FIGS. 29-30), main housing 810 holds first and second components 830, 832 together. Bow end housing 820 further includes an outwardly extending shelf portion 840 adapted to engage with retaining system 802, as described in further detail below. Bow end housing 820 may be constructed of plastic.

Figure 30:
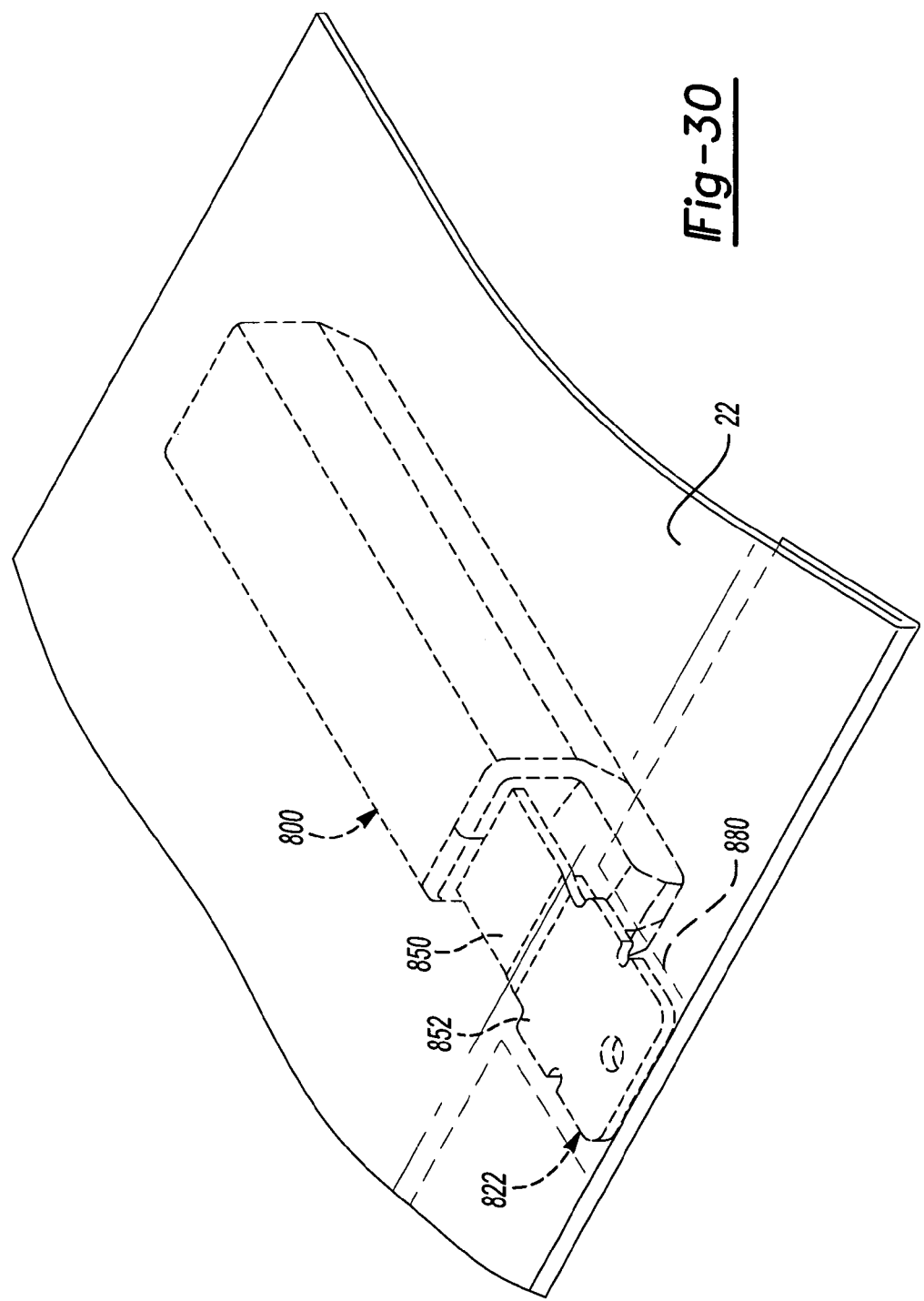
FIG. 30 is a perspective view illustrating the bow member engaged with the fabric cover of the tonneau cover system of the present invention.

Plunger 822 is received and supported by main housing 810 and bow end housing 820. Plunger 822 includes a main body 850, a head portion 852 extending outwardly from main body 850, and a leaf portion 854. Head portion 852 has a generally flat and rectangular construction and is adapted to directly engage with fabric cover 22 of tonneau system 12 (FIG. 30). Leaf portion supports spring 824 along the length thereof. Plunger 822 may be constructed of steel and, furthermore, may be relatively thin enough so as to be flexible. For example, plunger 822 can be made of ⅛ inch thick steel.

Figure 28:
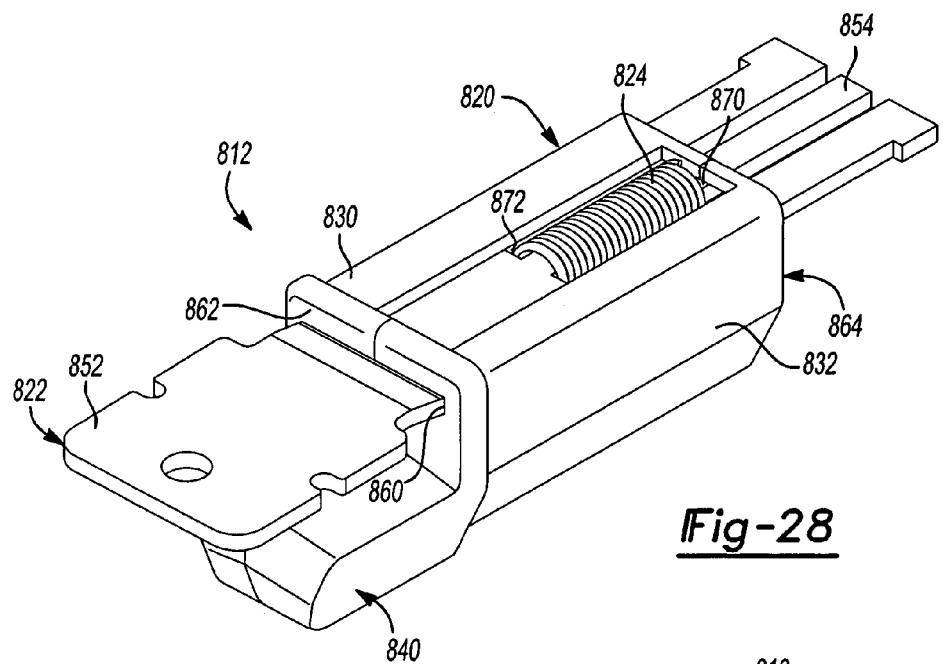
FIG. 28 is a perspective view illustrating a portion of the bow member with the plunger in an inward position.
Figure 29:
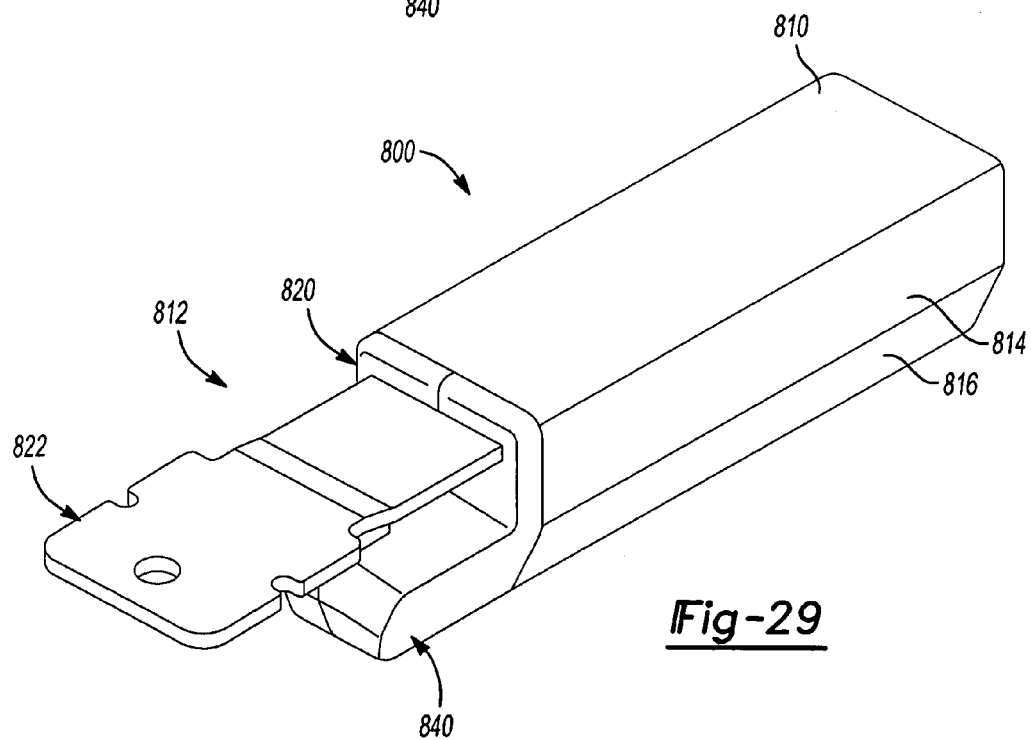
FIG. 29 is a perspective view illustrating the bow member assembled together.

When bow end assembly 812 is assembled together, the components of bow end housing 820 are disposed around main body 850 and leaf portion 854 of plunger 822 such that plunger 822 is slidably supported in a slot 860 formed through end surfaces 862, 864 of bow end housing 820. Furthermore, a window 866 is formed in a top surface 868 of bow end housing 820. Window 866 is configured so that spring 824 can be disposed between first and second components 830, 832 of bow end housing 820. Furthermore, window 866 is configured so that spring 824 can engage and extend between a rear face 870 of window 866 and an inner face 872 of plunger 822. As seen in FIG. 28, when plunger 822 is moved inwardly along slot 860 to an inward position, spring 824 is compressed between rear face 870 of window 866 and inner face 872 of plunger 822. Therefore, spring 824 biases plunger 822 outwardly relative to bow end housing 820 and main housing 810 towards an extended position (FIGS. 26-27, 29-30).

With particular reference to FIG. 30, fabric cover 22 of tonneau system 12 folds over head portion 852 of plunger 822. A pocket 880 may be sewn or otherwise formed in fabric cover to receive plunger 822. As plunger is moveable an inward position (FIG. 28), pocket 880 may be formed before fabric cover 22 is disposed on vehicle bow member 800.

Furthermore, as spring 824 biases plunger 822 outwardly, plunger 822 biases fabric cover 22 outwardly in the cross vehicle direction when engaged with fabric cover 22. Accordingly, vehicle bow member 800 operates to tension fabric cover 22 in the cross vehicle or side to side direction. This tensioning of fabric cover 22 in the cross vehicle direction may improve performance of tonneau system 12. It should be appreciated that front frame rail assembly 26 and/or rear frame rail assembly 32 can comprise bow end assembly 812, such that plungers 822 are received in corresponding pockets 880 of fabric cover 22. In this regard, bow end assembly 812 can bias fabric cover 22 of tonneau system 12 in a cross vehicle direction.

Figure 32:
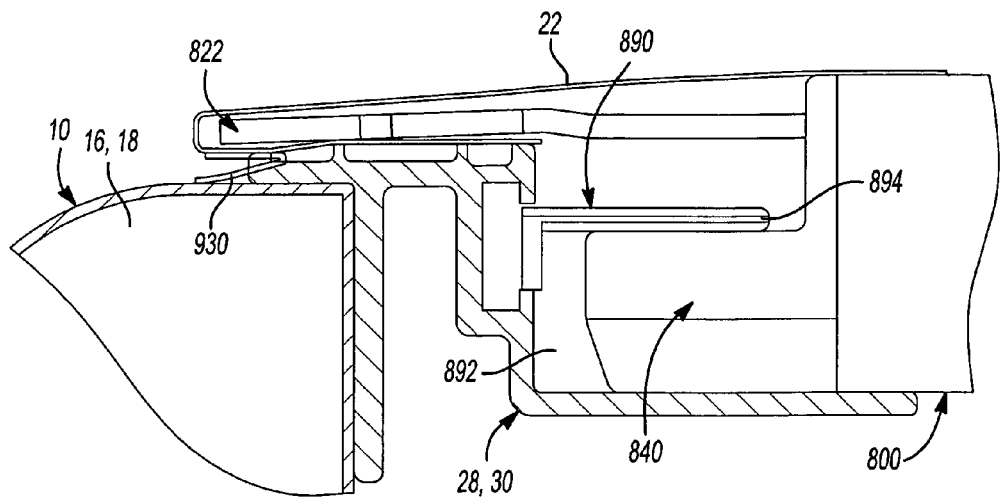
FIG. 32 is another side view illustrating the bow member and the retaining block member.
Figure 33:
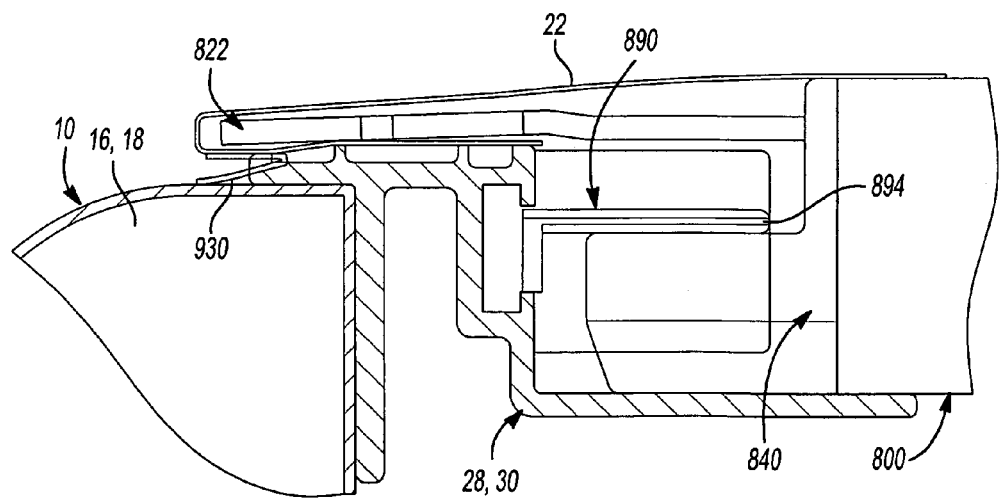
FIG. 33 is another side view illustrating the bow member and the retaining block member.

With reference to FIGS. 31-33, alternate retaining system 802 includes retaining bracket 890. Retaining bracket 890 is shaped to define a main body 892 having a generally circular cross section and two wing portions 894 extending outwardly from main body 892 in opposing directions. Main body 892 is disposed adjacent one of frame rail assembly 28, 30 and fastened thereto via conventional means, such as fasteners.

Wing portions 894 of retaining bracket 890 are shaped to capture shelf portion 840 of vehicle bow member 800 between one of wing portions 894 and one of frame rail assemblies 28, 30. That is, wing portions 894 may generally prevent vehicle bow member 800 from disengaging with retaining bracket 890 in a vertical direction. As seen in FIG. 31, shelf portion 840 has a cross section including tapered sidewalls 910, 912 corresponding to tapered portions 816 of main body 810. Furthermore, shelf portion 840 includes a top portion 914 and inclined portions 916, 918. Retaining bracket 890 may be configured so that when top portion of shelf portion 840 is engaged with one of wing portions 894, vehicle bow member 800 is secured between retaining bracket 890 and one of frame rail assemblies 28, 30 and oriented as desired relative to frame rail assemblies 28, 30. As seen in FIGS. 32-33, when vehicle bow member 800 is secured relative to retaining bracket 890, vehicle bow member positions plunger 822 proximate one of sidewalls 16, 18 of pickup truck 10. As plunger 822 may be flexible, plunger 822 may help exert a downward force to help sealingly engage a rubber seal 930 of cover 22 and one of sidewalls 16, 18. It should be appreciated that retaining system 802 can be configured so that one or more components, such as retaining bracket 890, are movable in a fore-aft direction of pickup truck 10 to engage bow member 800 and lock the position of tonneau system 12. Retaining system 802 is otherwise similar to retaining system 300 described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of releasably securing a cover to a vehicle, said method comprising:
   providing a cover spanning at least a portion of a frame, said frame having a retaining member and a pivot block;
   coupling a first end of said cover to a first bracket member;
   engaging and rotating said first bracket member relative to said frame from a first position to a second position, wherein at said second position, said first bracket member applies a tensioning force to said cover to bias said cover in a first direction and causes a bow member of said cover to engage said retaining member of said frame;
   coupling a second end of said cover to a second bracket member;
   engaging and rotating said second bracket member relative to said pivot block from a first position to a second position; and
   releasably securing said second bracket member at said second position relative to said pivot block.

2. The method according to claim 1 wherein said releasably securing said second bracket member at said second position relative to said pivot block comprises:
   providing a locking pawl system rotatably coupled to said pivot block, said locking pawl system positionable between a retracted position and an extended position;
   urging said locking pawl system into said retracted position while said engaging and rotating said second bracket member relative to said pivot block from said first position to said second position; and
   positioning said locking pawl system in said extended position to engage and retain said second bracket member relative to said pivot block.

3. The method of claim 2 wherein said urging said locking pawl system into said retracted position comprises pulling on a latch strap coupled to said locking pawl system.

4. The method of claim 1, further comprising:
   unsecuring said second bracket member; and
   positioning said second bracket member at a retracted position, wherein at said retracted position a portion of the vehicle beneath said cover is accessible.

5. The method of claim 4, wherein said unsecuring said second bracket member occurs after said engaging and rotating said first bracket member relative to said frame from said first position to said second position.

6. The method of claim 1, wherein said vehicle defines a forward end and a rear end, wherein said engaging and rotating said first bracket member comprises engaging and rotating said first bracket member adjacent said rear end of said vehicle, and wherein said engaging and rotating said second bracket member comprises engaging and rotating said second bracket member adjacent said forward end of said vehicle.

* * * * *

UNITED STATES PATENT AND TRADEMARK OFFICE
CERTIFICATE OF CORRECTION

PATENT NO. : 7,484,790 B2 Page 1 of 1
APPLICATION NO. : 11/746267
DATED : May 9, 2007
INVENTOR(S) : Donald G. Wheatley It is certified that error appears in the above-identified patent and that said Letters Patent is hereby corrected as shown below:

Column 2, line 48, "enlarge" should be --enlarged--.

Column 4, line 23, "is support" should be --supports--.

Column 7, line 37, "complimentary" should be --complementary--.

Column 13, line 61, "retaining" should be --retains--.

Column 14, line 27, after "positions", insert --of--.

Signed and Sealed this

Twelfth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,484,790 B2
APPLICATION NO. : 11/746267
DATED : February 3, 2009
INVENTOR(S) : Donald G. Wheatley Page 1 of 1

It is certified that error appears in the above-identified patent and that said Letters Patent is hereby corrected as shown below:

Column 2, line 48, "enlarge" should be --enlarged--.

Column 4, line 23, "is support" should be --supports--.

Column 7, line 37, "complimentary" should be --complementary--.

Column 13, line 61, "retaining" should be --retains--.

Column 14, line 27, after "positions", insert --of--.

This certificate supersedes the Certificate of Correction issued May 12, 2009.

Signed and Sealed this

Ninth Day of June, 2009

JOHN DOLL
*Acting Director of the United States Patent and Trademark Office*